United States Patent
Kuno et al.

(10) Patent No.: US 10,974,520 B2
(45) Date of Patent: Apr. 13, 2021

(54) IMAGE PROCESSING DEVICE GENERATING PRINT DATA USING PROFILE CORRESPONDING TO PRINTING DIRECTION

(71) Applicant: Brother Kogyo Kabushiki Kaisha, Nagoya (JP)

(72) Inventors: Masashi Kuno, Obu (JP); Shota Morikawa, Nagoya (JP); Satoru Arakane, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/539,669

(22) Filed: Aug. 13, 2019

(65) Prior Publication Data

US 2020/0055324 A1 Feb. 20, 2020

(30) Foreign Application Priority Data

Aug. 20, 2018 (JP) ............................. JP2018-154087

(51) Int. Cl.
| | |
|---|---|
| *B41J 2/525* | (2006.01) |
| *B41J 19/20* | (2006.01) |
| *H04N 1/60* | (2006.01) |
| *G06K 15/02* | (2006.01) |
| *B41J 2/21* | (2006.01) |

(52) U.S. Cl.
CPC ............ *B41J 2/525* (2013.01); *B41J 2/2132* (2013.01); *B41J 19/205* (2013.01); *G06K 15/188* (2013.01); *H04N 1/6063* (2013.01)

(58) Field of Classification Search
CPC ..................................................... B41J 2/2132
See application file for complete search history.

(56) References Cited

U.S. PATENT DOCUMENTS

| 9,571,696 B2 | 2/2017 | Morikawa | |
|---|---|---|---|
| 2005/0018256 A1* | 1/2005 | Corbin | G06K 15/027 358/501 |
| 2010/0214336 A1* | 8/2010 | Kuno | B41J 19/147 347/12 |

(Continued)

FOREIGN PATENT DOCUMENTS

| JP | 2005-342962 A | 12/2005 |
|---|---|---|
| JP | 2016-124138 A | 7/2016 |

*Primary Examiner* — Shelby L Fidler
(74) *Attorney, Agent, or Firm* — Banner & Witcoff, Ltd.

(57) ABSTRACT

In an image processing device, a controller is configured to perform: selecting; generating; and outputting. The selecting selects a target partial image one by one from a plurality of partial images. The target partial image is represented by target partial image data. The generating generates partial print data for a partial print by executing an image process on the target partial image data. The partial print forms the target partial image while moving a print head in a printing direction. The partial print forms the target partial image while moving a print head in a printing direction. The image process includes a color conversion process. The color conversion process is executed on the target partial image data using one of a first profile and a second profile selected in accordance with the printing direction set for the partial print. The outputting outputs the partial print data to the printer.

14 Claims, 14 Drawing Sheets

(56) References Cited

U.S. PATENT DOCUMENTS

| | | | |
|---|---|---|---|
| 2010/0265521 A1* | 10/2010 | Yakubov | B41J 2/2132 358/1.9 |
| 2016/0191745 A1 | 6/2016 | Morikawa | |
| 2018/0332193 A1* | 11/2018 | Tsuchiya | G06F 3/1206 |
| 2020/0042841 A1* | 2/2020 | Morikawa | G06K 15/1881 |
| 2020/0311497 A1* | 10/2020 | Kondo | G06K 15/1881 |

\* cited by examiner

FIG. 7

| | R | G | B | V |
|---|---|---|---|---|
| 300 | 0 | 0 | 0 | 0 |
| | 0 | 32 | 0 | 0 |
| | 0 | 64 | 0 | 1 |
| IV1→ | 0 | 255 | 0 | 1 |
| | ⋮ | ⋮ | ⋮ | ⋮ |
| | 224 | 255 | 0 | −1 |
| | 224 | 255 | 32 | −1 |
| | ⋮ | ⋮ | ⋮ | ⋮ |
| IV3→ | 225 | 0 | 0 | 1 |
| | ⋮ | ⋮ | ⋮ | ⋮ |
| IV2→ | 255 | 255 | 0 | −1 |
| | ⋮ | ⋮ | ⋮ | ⋮ |
| | 255 | 255 | 255 | 0 |

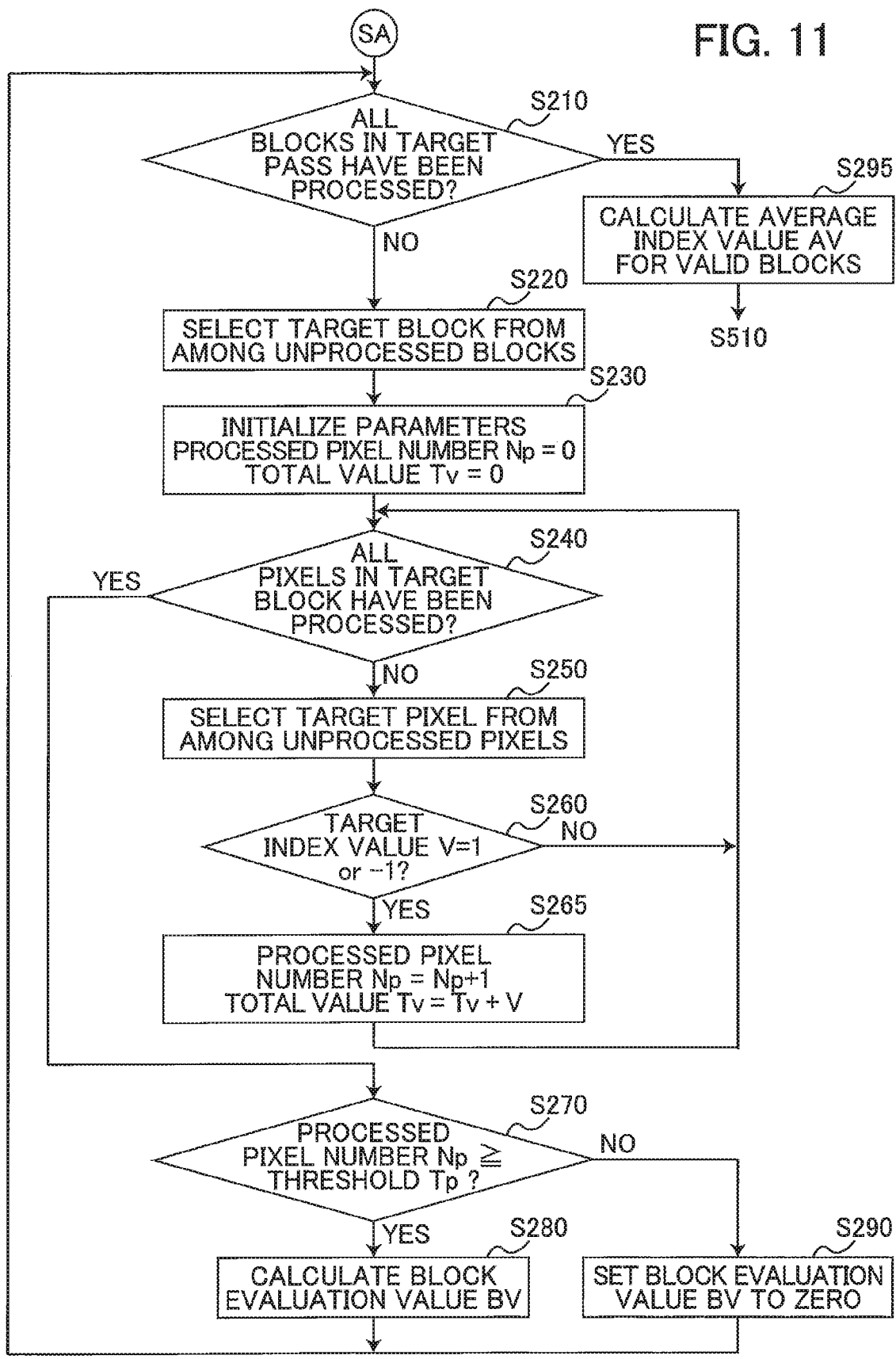

IMAGE PROCESSING DEVICE GENERATING PRINT DATA USING PROFILE CORRESPONDING TO PRINTING DIRECTION

CROSS REFERENCE TO RELATED APPLICATION

This application claims priority from Japanese Patent Application No. 2018-154087 filed Aug. 20, 2018. The entire content of the priority application is incorporated herein by reference.

TECHNICAL FIELD

The present disclosure relates to an image process for a printer that performs printing by alternately and repeatedly executing a partial print to form dots while performing a main scan, and a sub scan.

BACKGROUND

A printer known in the art has a plurality of recording heads arrayed in a main scanning direction. The recording heads are supported in a carriage and are scanned in both outgoing and return directions while recording ink in both directions. A printer driver uses conversion tables to convert RGB data to CMYK data. This type of printer may produce different color tones between scans in the outgoing direction and scans in the return direction due to the different order in which the colors of ink are overlapped. Therefore, the conventional printer uses a first conversion table when generating data for an outgoing scan and uses a second conversion table when generating data for a return scan. The second conversion table is configured to convert data to produce colors in a return scan that approach the colors recorded in an outgoing scan.

SUMMARY

However, when performing data conversion for generating return scan data to produce colors that approach the colors recorded in an outgoing scan, the range of colors that can be printed is limited to the range of colors that can be printed in both an outgoing scan and a return scan.

In view of the foregoing, it is an object of the present disclosure to provide a technique capable of relaxing the restrictions on the range of printable colors.

In order to attain the above and other objects, the present disclosure provides an image processing device. The image processing device is communicable with a printer. The printer includes: a print head; a first scanner; and a second scanner. The print head has a plurality of nozzles. Each of the plurality of nozzles is configured to eject a droplet of one of a plurality of types of ink including a first type of ink and a second type of ink. The plurality of nozzles includes a first nozzle and a second nozzle. The second nozzle is disposed apart from the first nozzle in a main scanning direction. The first nozzle is configured to eject a droplet of the first type of ink. The second nozzle is configured to eject a droplet of a second type of ink. The first scanner is configured to perform a main scan. The main scan moves the print head relative to a printing medium in a printing direction. The printing direction being set to one of a first direction and a second direction. The first direction and the second direction are parallel to the main scanning direction and are opposite to each other. The second scanner is configured to perform a sub scan. The sub scan intermittently moves the printing medium relative to the print head in a sub scanning direction orthogonal to the main scanning direction. The printer is configured to repeatedly and alternately execute a partial print and the sub scan to form an image represented by image data on the printing medium. The image is made up of a plurality of partial images arranged in the sub scanning direction. The partial print forms a target partial image on the printing medium while performing the main scan. The plurality of partial images is represented by respective ones of the plurality of sets of partial image data. The image processing device includes: a memory; and a controller. The memory is configured to store a first profile and a second profile used in a color conversion process executed for a first-direction partial print and a second-direction partial print, respectively. The first-direction partial print is the partial print in which the printing direction is set to the first direction. The second-direction partial print is the partial print in which the printing direction is set to the second direction. The first profile correlates a plurality of input color values in a specific color space with respective ones of a plurality of first output color values within a first color range in an ink color space. The second profile correlates the plurality of input color values in the specific color space with respective ones of a plurality of second output color values within a second color range in the ink color space. The ink color space includes a plurality of ink color values. Each of the plurality of ink color values has a plurality of color component values corresponding to respective ones of the plurality of types of ink. The first color range includes a first ink color value representing a first color printable by the first-direction partial print and excludes a second ink color value representing a second color unprintable by the first-direction partial print. The second color range includes a third ink color value representing a third color printable by the second-direction partial print and excludes a fourth ink color value representing a fourth color unprintable by the second-direction partial print. The controller is configured to perform: (a) selecting; (b) generating; and (c) outputting. The (a) selecting selects a single partial image one by one from the plurality of partial images as the target partial image. The target partial image is represented by target partial image data. The target partial image data corresponds to one of the plurality of sets of partial image data. The (b) generating generates partial print data for the partial print by executing an image process on the target partial image data. The partial print data is to be used for forming the target partial image by the printer. The image process includes the color conversion process. The color conversion process is executed on the target partial image data using one of the first profile and the second profile selected in accordance with the printing direction set for the partial print. The (c) outputting outputs to the printer the partial print data generated for the partial print.

According to another aspect, the present disclosure also provides a non-transitory computer readable storage medium storing a set of program instructions for an image processing device. The image processing device is communicable with a printer. The printer includes: a print head; a first scanner; and a second scanner. The print head has a plurality of nozzles. Each of the plurality of nozzles is configured to eject a droplet of one of a plurality of types of ink including a first type of ink and a second type of ink. The plurality of nozzles includes a first nozzle and a second nozzle. The second nozzle is disposed apart from the first nozzle in a main scanning direction. The first nozzle is configured to eject a droplet of the first type of ink. The second nozzle is configured to eject a droplet of a second type of ink. The first scanner is configured to perform a main scan. The main scan moves the print head relative to a printing medium in a printing direction. The printing direction is set to one of a first direction and a second direction. The first direction and the second direction are parallel to the main scanning direction and are opposite to each other. The second scanner is configured to perform a sub scan. The sub scan intermittently moves the printing medium relative to the print head in a sub scanning direction orthogonal to the main scanning direction. The printer is configured to repeatedly and alternately execute a partial print and the sub scan to form an image represented by image data on the printing medium. The image is made up of a plurality of partial images arranged in the sub scanning direction. The partial print forms a target partial image on the printing medium while performing the main scan. The plurality of partial images is represented by respective ones of the plurality of sets of partial image data. The image processing device includes: a memory; and a controller. The memory is configured to store a first profile and a second profile used in a color conversion process executed for a first-direction partial print and a second-direction partial print, respectively. The first-direction partial print is the partial print in which the printing direction is set to the first direction. The second-direction partial print is the partial print in which the printing direction is set to the second direction. The first profile correlates a plurality of input color values in a specific color space with respective ones of a plurality of first output color values within a first color range in an ink color space. The second profile correlates the plurality of input color values in the specific color space with respective ones of a plurality of second output color values within a second color range in the ink color space. The ink color space includes a plurality of ink color values. Each of the plurality of ink color values has a plurality of color component values corresponding to respective ones of the plurality of types of ink. The first color range includes a first ink color value representing a first color printable by the first-direction partial print and excludes a second ink color value representing a second color unprintable by the first-direction partial print. The second color range includes a third ink color value representing a third color printable by the second-direction partial print and excludes a fourth ink color value representing a fourth color unprintable by the second-direction partial print. The set of program instructions, when executed by the controller, causes the image processing device to perform: (a) selecting; (b) generating; and (c) outputting. The (a) selecting selects a single partial image one by one from the plurality of partial images as the target partial image. The target partial image is represented by target partial image data. The target partial image data corresponds to one of the plurality of sets of partial image data. The (b) generating generates partial print data for the partial print by executing an image process on the target partial image data. The partial print data is to be used for forming the target partial image by the printer. The image process includes the color conversion process. The color conversion process is executed on the target partial image data using one of the first profile and the second profile selected in accordance with the printing direction set for the partial print. The (c) outputting outputs to the printer the partial print data generated for the partial print.

BRIEF DESCRIPTION OF THE DRAWINGS

The particular features and advantages of the disclosure as well as other objects will become apparent from the following description taken in connection with the accompanying drawings, in which:

FIG. 7 is a table representing an example of an index table defining correlations between RGB values and index values;

FIG. 11 is a flowchart illustrating steps in part of a printing process executed by a terminal device according to a second embodiment of the present disclosure;

DETAILED DESCRIPTION

A. First Embodiment

Figure 1:
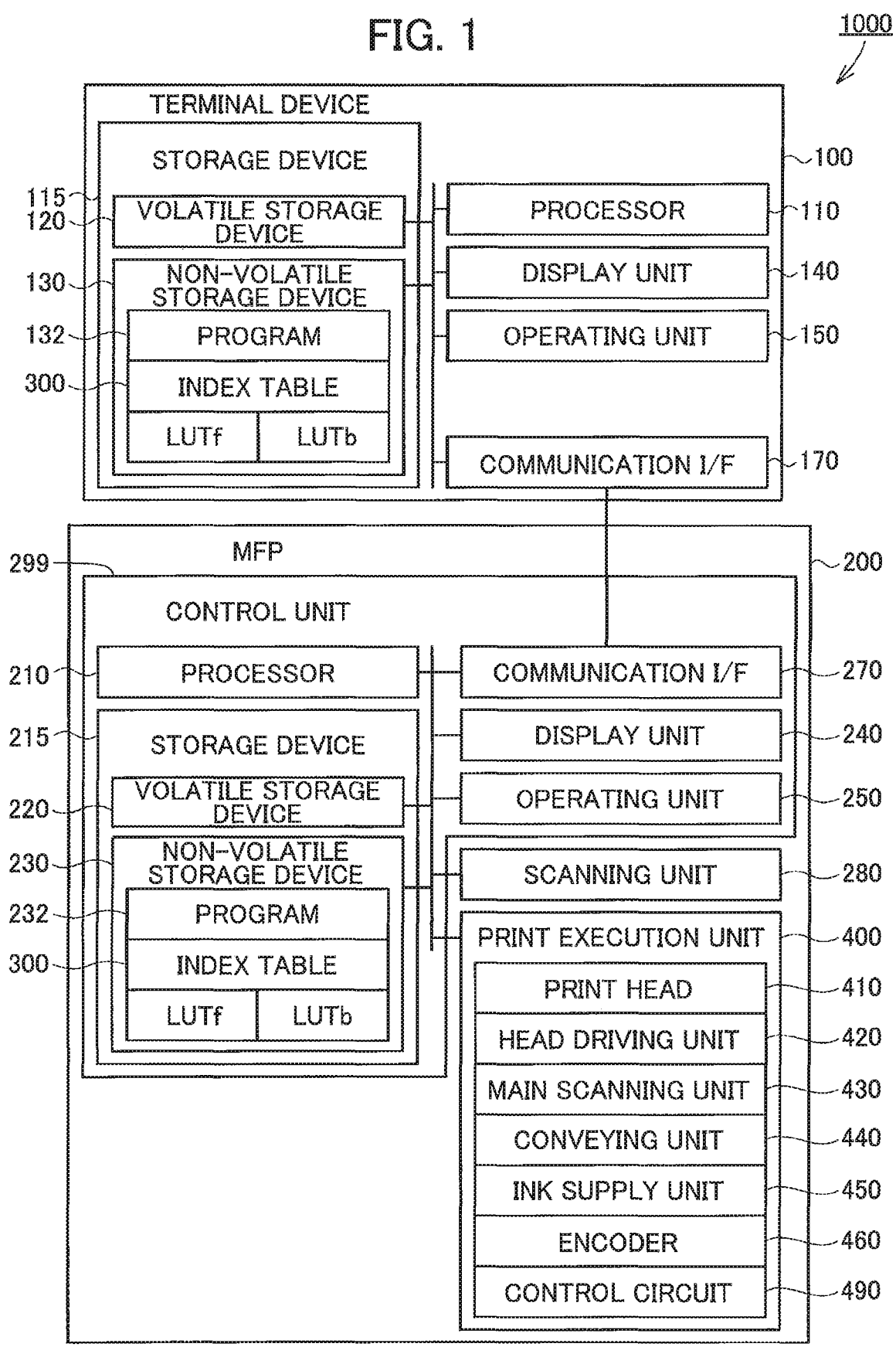
FIG. 1 is an explanatory view illustrating a configuration of an image processing system including a multifunction peripheral and a terminal device according to a first embodiment of the present disclosure.

A-1. Structures of a Terminal Device 100 and a Multifunction Peripheral 200:

FIG. 1 is an explanatory view illustrating the configuration of an image processing system 1000 according to the first embodiment. The image processing system 1000 includes a terminal device 100 and a multifunction peripheral (MFP) 200 connected to the terminal device 100. As described later, the MFP 200 has a control unit 299, a scanning unit 280, and a print execution unit 400.

The terminal device 100 is a personal computer, such as a desktop computer or a tablet computer. The terminal device 100 includes a processor 110, a storage device 115, a display unit 140 for displaying images, an operating unit 150 for receiving user operations, and a communication interface 170. All of these components are interconnected via a bus.

The processor 110 is a central processing unit (CPU), for example, for performing data processes. The storage device 115 has a volatile storage device 120, and a non-volatile storage device 130. The volatile storage device 120 is a dynamic random access memory (DRAM), for example, and the non-volatile storage device 130 is flash memory, for example.

The non-volatile storage device 130 stores a program 132, an index table 300, an outgoing lookup table LUTf, and a return lookup table LUTb. By executing the program 132, the processor 110 implements various functions. The functions implemented by the program 132 and the index table 300, outgoing lookup table LUTf, and return lookup table LUTb stored in the non-volatile storage device 130 will be described later in greater detail. The processor 110 temporarily stores various intermediate data used for executing the program 132 in the storage device 115 (either the volatile storage device 120 or non-volatile storage device 130, for example). In the present embodiment, the program 132, index table 300, and lookup tables LUTf and LUTb are included in a device driver provided by the manufacturer of the MFP 200.

The display unit 140 is a liquid crystal display, for example, that serves to display images. However, another type of device that displays images may be employed as the display unit 140, such as a light-emitting diode (LED) display or an organic light-emitting diode (OLED) display. The operating unit 150 is a device that accepts user operations, such as a touchscreen arranged over the display unit 140. However, various other devices operated by the user, such as buttons, levers and the like, may be employed as the operating unit 150. By operating the operating unit 150, the user can input various commands and instructions into the terminal device 100.

The communication interface 170 is an interface for communicating with other devices. For example, the communication interface 170 may be a universal serial bus (USB) interface, a wired local area network (LAN) interface, or a wireless communication interface conforming to the IEEE 802.11 standard. The MFP 200 is connected to the communication interface 170.

In response to user commands, the terminal device 100 drives the MFP 200 and controls the MFP 200 to print images.

The MFP 200 has the scanning unit 280 for reading an original or other object, the print execution unit 400 for printing images, and the control unit 299 for controlling overall operations of the MFP 200.

The control unit 299 includes a processor 210, a storage device 215, a display unit 240 for displaying images, an operating unit 250 for receiving operations by the user, and a communication interface 270. All of these components are interconnected via a bus.

The processor 210 is a CPU, for example, for performing data processes. The storage device 215 includes a volatile storage device 220, and a non-volatile storage device 230. The volatile storage device 220 is DRAM, for example, and the non-volatile storage device 230 is flash memory, for example.

The non-volatile storage device 230 stores a program 232, the index table 300, the outgoing lookup table LUTf, and the return lookup table LUTb. By executing the program 232, the processor 210 implements various functions (described later). The processor 210 temporarily stores various intermediate data in a storage device (either the volatile storage device 220 or non-volatile storage device 230, for example) for use when executing the program 232. The index table 300, outgoing lookup table LUTf, and return lookup table LUTb stored in the non-volatile storage device 230 are identical to the index table 300, outgoing lookup table LUTf, and return lookup table LUTb stored in the non-volatile storage device 130 of the terminal device 100, respectively. In the present embodiment, the program 232, index table 300, and lookup tables LUTf and LUTb are pre-stored in the non-volatile storage device 230 by the manufacturer of the MFP 200 as firmware.

The display unit 240 is a liquid crystal display, for example, that functions to display images. However, another type of device for displaying images, such as an LED display or an OLED display, may be used as the display unit 240. The operating unit 250 is a device capable of receiving operations performed by the user, and may be a touchscreen arranged over the display unit 240, for example. However, another type of device operated by the user, such as buttons, levers, and the like, may be employed as the operating unit 250. By operating the operating unit 250, the user can input various commands and instructions into the MFP 200.

The communication interface 270 is an interface capable of communicating with other devices. In the present embodiment, the communication interface 270 is connected to the communication interface 170 of the terminal device 100.

The scanning unit 280 optically reads an original or other object using a photoelectric conversion element such as a CCD or CMOS to generate scan data representing the read image (called a "scanned image"). The scan data is RGB bitmap data representing a color scanned image, for example.

The print execution unit 400 is a device that prints images on sheets of paper (an example of a printing medium). In the present embodiment, the print execution unit 400 includes a print head 410, a head driving unit 420, a main scanning unit 430, a conveying unit 440, an ink supply unit 450, an encoder 460, and a control circuit 490 for controlling the print head 410, head driving unit 420, main scanning unit 430, conveying unit 440, ink supply unit 450, and encoder 460. As will be described later in greater detail, the print execution unit 400 is an inkjet-type printer using ink in the colors cyan (C), magenta (M), yellow (Y), and black (K). Note that the combination of ink colors used by the MFP 200 is not limited to cyan, magenta, yellow, and black; various other combinations of colors may be used (cyan, magenta, and yellow, for example).

The MFP 200 can control the print execution unit 400 to print images based on print data supplied by another device (the terminal device 100, for example). In addition, the MFP 200 can drive the scanning unit 280 in response to user commands to optically read an object and to generate scan data representing the object. Subsequently, the MFP 200 can control the print execution unit 400 to print an image represented by the scan data. In addition, the MFP 200 can acquire image data (JPG data, for example) from an external device (a memory card connected to the communication interface 270, for example) and can control the print execution unit 400 to print an image represented by the acquired image data.

Figure 2:
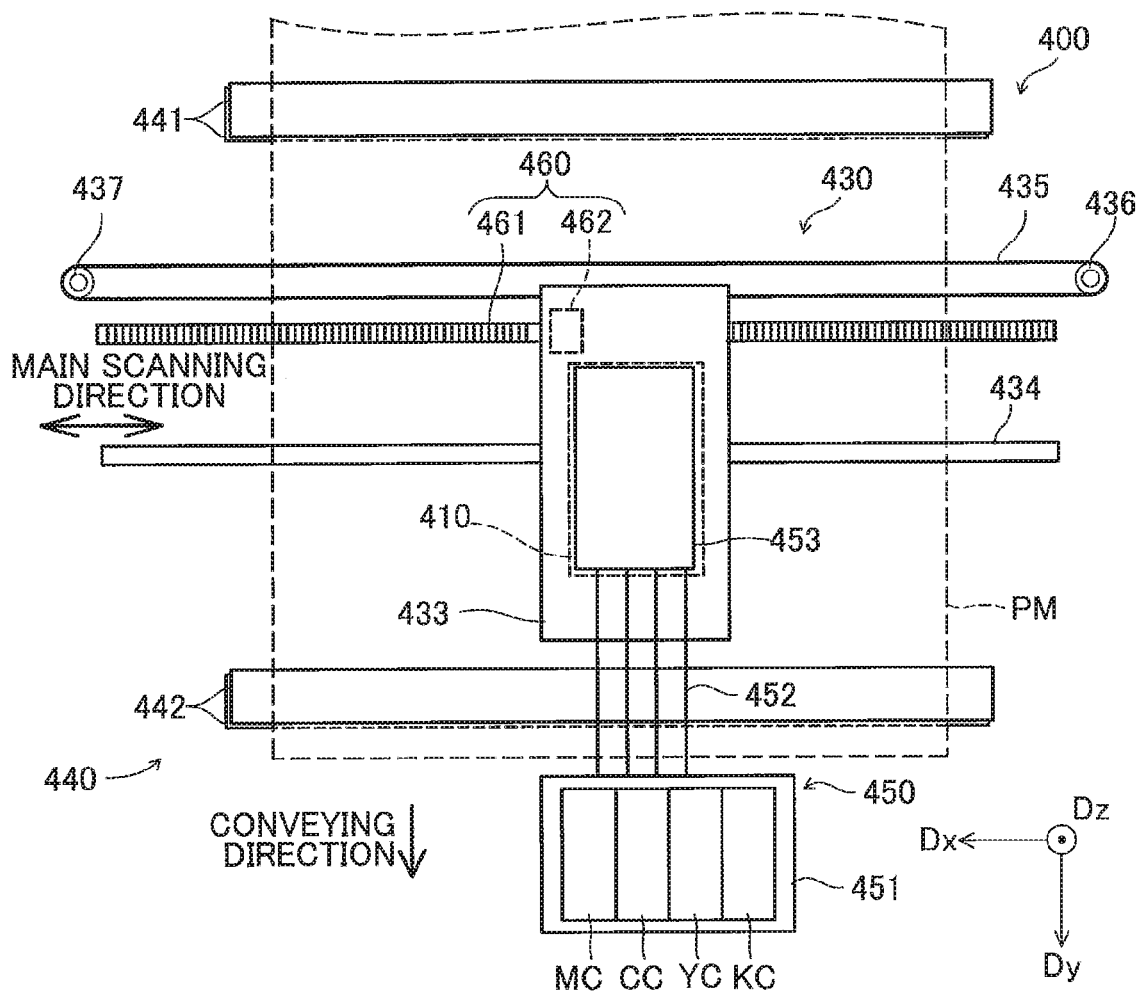
FIG. 2 illustrates an overall structure of a print execution unit in the multifunction peripheral.

FIG. 2 illustrates the overall structure of the print execution unit 400. As illustrated in FIG. 2, the main scanning unit 430 is provided with a carriage 433, a sliding shaft 434, a belt 435, and a plurality of pulleys 436 and 437. The carriage 433 supports the print head 410. The sliding shaft 434 holds the carriage 433 so that the carriage 433 can reciprocate in a main scanning direction (directions along the Dx-axis in FIG. 2). The belt 435 is looped around the pulleys 436 and 437, with a portion of the belt 435 fixed to the carriage 433. The pulley 436 rotates when driven by a main scanning motor (not illustrated). When the main scanning motor rotates the pulley 436, the carriage 433 moves along the sliding shaft 434, thereby implementing a main scan in which the print head 410 is reciprocated in the main scanning direction relative to a sheet PM.

The conveying unit 440 holds the sheet PM while conveying the sheet PM in a conveying direction (+Dy direction) relative to the print head 410. In the following description, the upstream side in the conveying direction (−Dy side) will be simply called the upstream side, while the downstream side in the conveying direction (+Dy side) will be simply called the downstream side. The conveying unit 440 is provided with a pair of upstream rollers 441 that hold the sheet PM on the upstream side of the print head 410, a pair of downstream rollers 442 that hold the sheet PM on the downstream side of the print head 410, and a motor (not illustrated). Using the drive force generated by the motor, the conveying unit 440 drives the rollers 441 and 442 to convey the sheet PM in the conveying direction. Hereinafter, the process of moving the sheet PM in the conveying direction will be called a sub scan. In addition, the conveying direction will be also called the sub scanning direction.

The ink supply unit 450 delivers ink to the print head 410. The ink supply unit 450 is provided with a cartridge mounting unit 451, tubes 452, and a buffer tank 453. A plurality of ink cartridges KC, YC, CC, and MC are detachably mounted in the cartridge mounting unit 451. The ink cartridges KC, YC, CC, and MC are containers accommodating ink therein and supply this ink to the buffer tank 453 via the tubes 452. The buffer tank 453 is disposed in the carriage 433 above the print head 410 (+Dz side) and temporarily accommodates ink in the colors CMYK to be supplied to the print head 410. The tubes 452 are flexible ink channels that connect the cartridge mounting unit 451 to the buffer tank 453. Ink in each ink cartridge is supplied to the print head 410 via the cartridge mounting unit 451, tubes 452, and buffer tank 453. A filter (not illustrated) is provided in the buffer tank 453 for removing foreign matter from the ink.

Figure 3:
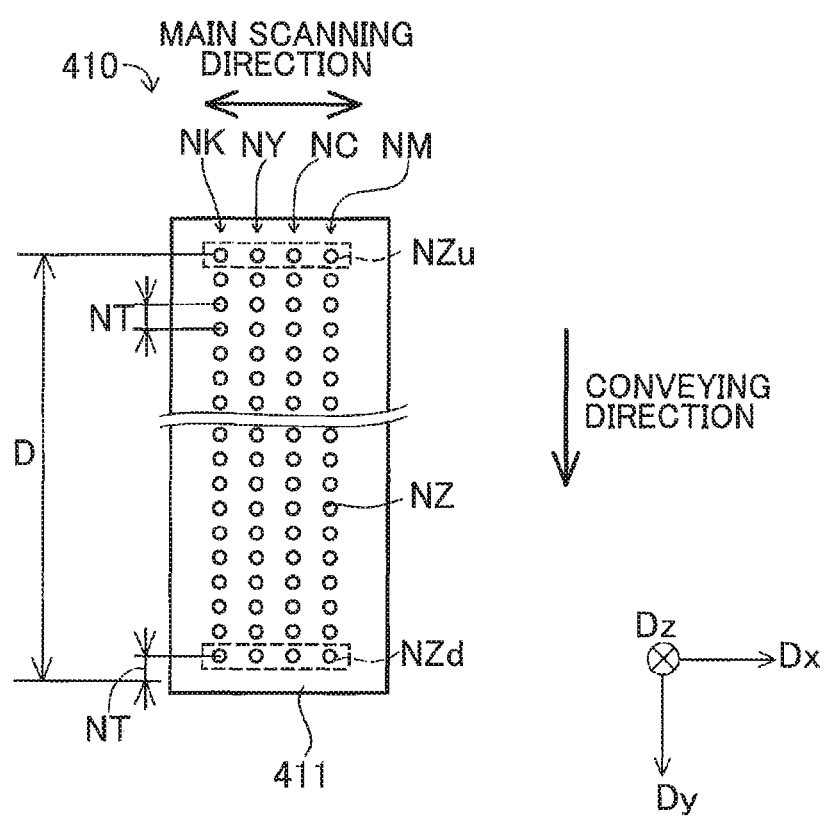
FIG. 3 illustrates a structure of a print head in the print execution unit viewed from the −Dz side.

FIG. 3 illustrates the structure of the print head 410 viewed from below (−Dz side). As illustrated in FIG. 3, the surface of the print head 410 that faces the sheet PM conveyed by the conveying unit 440 is a nozzle-forming surface 411. A plurality of nozzle rows, and specifically nozzle rows NC, NM, NY, and NK for ejecting ink in the respective colors C, M, Y, and K is formed in the nozzle-forming surface 411 of the print head 410. Each nozzle row is configured of a plurality of nozzles NZ. The nozzles NZ included in each nozzle row are arranged at different positions in the conveying direction (+Dy direction) and specifically are spaced at a prescribed nozzle pitch NT in the conveying direction. The nozzle pitch NT is the distance in the conveying direction between any two nozzles NZ within the same nozzle row that neighbor each other in the conveying direction. The nozzle NZ in each nozzle row that is positioned on the most upstream side in the conveying direction (−Dy end) will be also called a most upstream nozzle NZu. The nozzle NZ in each nozzle row that is positioned on the most downstream side (+Dy end) will be also called a most downstream nozzle NZd. A distance obtained by adding the nozzle pitch NT to the distance in the conveying direction from the most upstream nozzle NZu to the most downstream nozzle NZd will be also called a nozzle row length D.

The nozzle rows NC, NM, NY, and NK are arranged at different positions in the main scanning direction and at overlapping positions in the sub scanning direction. In the example of FIG. 3, nozzle rows NK, NY, NC, and NM are arranged in this order along the +Dx direction.

Each nozzle NZ is connected to the buffer tank 453 via an ink channel (not illustrated) formed in the print head 410. An actuator (not illustrated) is provided in each ink channel for ejecting ink from the corresponding nozzles NZ.

The head driving unit 420 (see FIG. 1) includes an electric circuit for driving each of the actuators in the print head 410 according to print data during main scans performed by the main scanning unit 430. This driving ejects ink from nozzles NZ formed in the print head 410 to form dots on a sheet PM conveyed by the conveying unit 440.

The encoder 460 (see FIGS. 1 and 2) is a device known as a linear encoder that detects the position of the print head 410 in the main scanning direction. As illustrated in FIG. 2, the encoder 460 is provided with a linear scale 461, and an optical sensor 462. The linear scale 461 is a strip-like member extending in the main scanning direction and is fixed inside the housing of the print execution unit 400. Transmissive parts that transmit light and non-transmissive parts that do not transmit light are alternately formed in the linear scale 461 along the longitudinal direction thereof. As illustrated in FIG. 2, the optical sensor 462 is supported on the carriage 433 and moves along with the print head 410 during main scans. The optical sensor 462 includes a light-emitting element and a light-receiving element. The linear scale 461 is positioned between the light-emitting element and light-receiving element. During a main scan in which the carriage 433 (the print head 410) moves in the main scanning direction, light emitted from the light-emitting element is repeatedly and alternately received by the light-receiving element when passing through a transmissive part of the linear scale 461 and not received by the light-receiving element when blocked by a non-transmissive part. The encoder 460 outputs a pulse signal indicating the changes in light received by the light-receiving element of the optical sensor 462. Since the position of the carriage 433 in the main scanning direction can be acquired on the basis of this pulse signal, the pulse signal can be called a position signal indicating the position of the carriage 433 in the main scanning direction. The position signal outputted from the encoder 460 is provided to the control circuit 490 and is used to control the print head 410 and the main scan.

A-2. Overview of a Printing Operation

The print execution unit 400 prints an image on a sheet PM by repeatedly and alternately executing a partial print and a sub scan. In a partial print, the print execution unit 400 controls the main scanning unit 430 to perform a main scan while controlling the print head 410 to eject ink in order to form dots on the sheet PM. In a sub scan, the print execution unit 400 controls the conveying unit 440 to convey the sheet PM.

Figure 4:
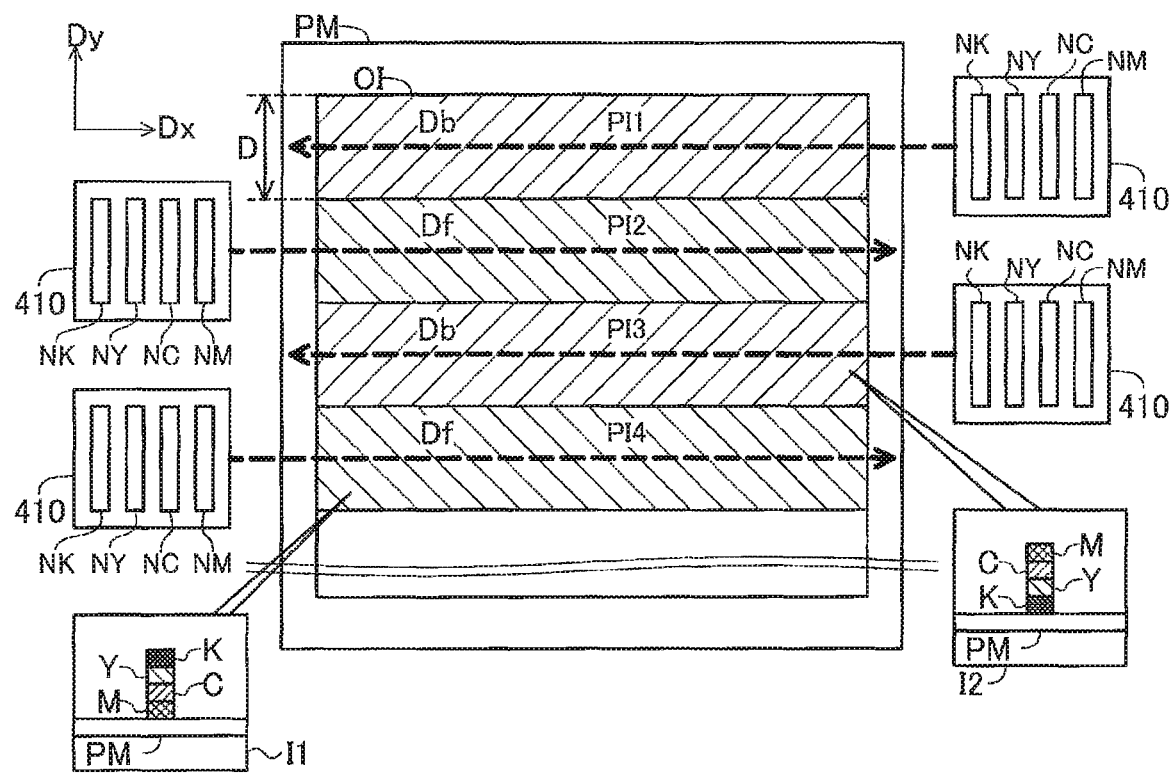
FIG. 4 is an explanatory diagram illustrating sample operations of the print head of the print execution unit while printing a print image on a sheet.

FIG. 4 is an explanatory diagram illustrating sample operations of the print execution unit 400. FIG. 4 illustrates a print image OI printed on a sheet PM. The print image OI includes a plurality of partial images PI1 to PI4 arranged in the −Dy direction. Each partial image is printed with a single partial print. The printing direction for a partial print is one of an outgoing direction and a return direction. Hence, a partial print is either an outgoing print in which dots are formed while a main scan is performed to move the print head 410 in an outgoing direction Df (the +Dx direction in FIG. 4) or a return print in which dots are formed while a main scan is performed to move the print head 410 in a return direction Db (the +Dx direction in FIG. 4). Arrows formed of dashed lines and pointing in either the +Dx direction or −Dx direction are included in each partial image of FIG. 4. An arrow pointing in the +Dx direction specifies the outgoing direction Df, while an arrow pointing in the −Dx direction specifies the return direction Db. In the example of FIG. 4, partial images PI1 and PI3 are return partial images printed by return prints, while partial images PI2 and PI4 are outgoing partial images printed by outgoing prints. Thus, return prints and outgoing prints are performed alternately in the example of FIG. 4. This type of printing method is called bidirectional printing. As will be described later, the direction for a partial print is set for each partial image in the present embodiment. Therefore, a plurality of outgoing partial images may be printed in succession or a plurality of return partial images may be printed in succession. In the following description, a single partial print will be also called a "pass process" or simply a "pass."

In FIG. 4, the +Dy direction is the conveying direction for the sheet PM. The partial images are printed in order one at a time beginning from the partial image on the +Dy end of the print image OI and progressing in the −Dy direction. Printing in the present embodiment is a process known as one-pass printing, and the dimension of each partial image in the conveying direction and one feed amount for the sheet PM are both equivalent to the nozzle row length D.

In FIG. 4, the order in which ink colors are overlapped in an outgoing print will be called a first order I1, while the order in which ink colors are overlapped in a return print will be called a second order I2. In the present embodiment, the first order I1 denotes the order MCYK progressing upward from the sheet PM, and the second order I2 denotes the order KYCM progressing upward from the sheet PM. Thus, the second order I2 is the opposite order from the first order I1. If the order that ink is overlapped differs between two printed colors, the two colors may appear different even when the types of overlapped inks and the quantities per unit area of each ink type are the same.

Figure 5A:
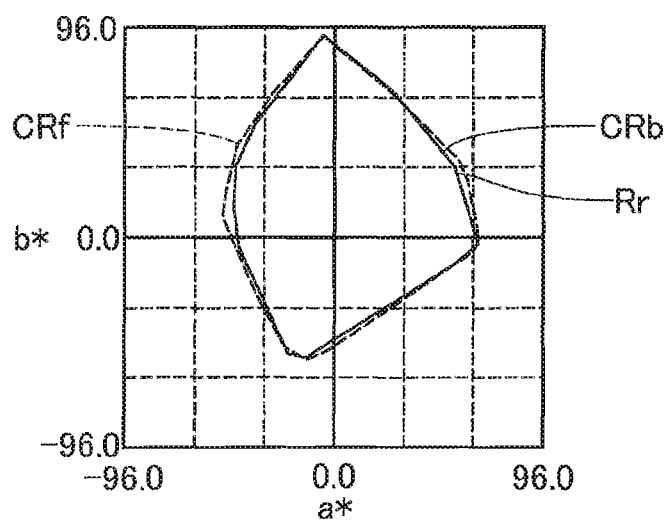
FIG. 5A is a graph showing examples of an outgoing maximum color range and a return maximum color range projected on an a*b* plane, in which depicted with a dashed line is the outgoing maximum color range representing the largest color range that can be printed according to an outgoing print, and depicted with a solid line is the return maximum color range representing the largest color range that can be printed according to a return print.
Figure 5B:
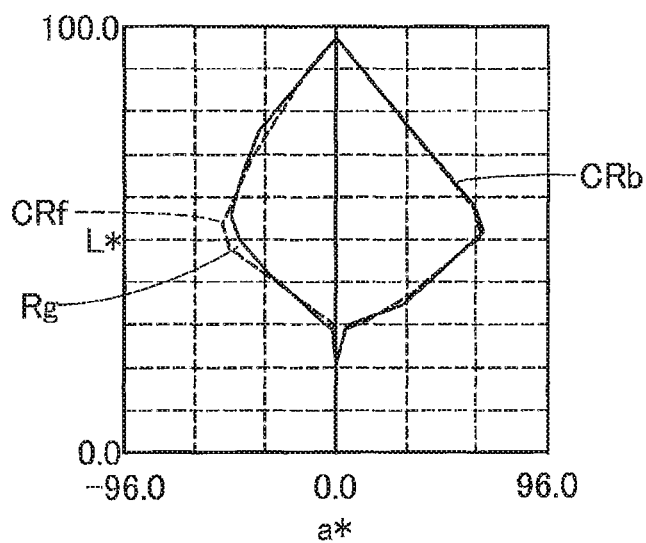
FIG. 5B is a graph showing examples of the outgoing maximum color range and the return maximum color range projected on an a*L* plane, in which the outgoing maximum color range is depicted with a dashed line and the return maximum color rage is depicted with a solid line.
Figure 5C:
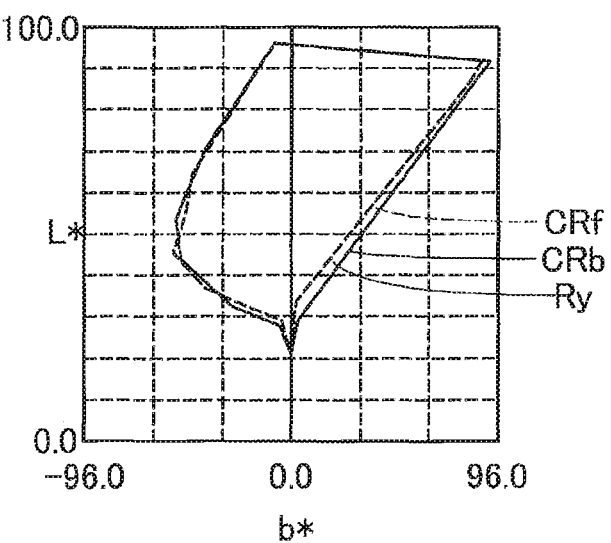
FIG. 5C is a graph showing examples of the outgoing maximum color range and the return maximum color range projected on a b*L* plane, in which the outgoing maximum color range is depicted with a dashed line and the return maximum color rage is depicted with a solid line.

FIGS. 5A to 5C are graphs showing examples of an outgoing maximum color range CRf and a return maximum color range CRb. The outgoing maximum color range CRf is the largest color range that can be printed through an outgoing print, while the return maximum color range CRb is the largest color range that can be printed through a return print. The outgoing maximum color range CRf is depicted with a dashed line, and the return maximum color range CRb with a solid line. Each graph is expressed using color components in the CIELAB color space (i.e., L*a*b*). These color ranges CRf and CRb are identified by measuring the colors of printed color patches. Further, the color ranges CRf and CRb are the largest color ranges produced when any combination of quantities per unit area within a predetermined allowable range can be used for the CMYK ink colors when printing color patches. The allowable range is set in advance through experimentation to ensure suitable printing. In the following description, the color of a printed image (i.e., the color identified through colorimetry) will be called the printed color.

The graph in FIG. 5A shows the maximum color ranges CRf and CRb projected on the a*b* plane. The horizontal axis in FIG. 5A represents the a* value, and the vertical axis the b* value. The graph in FIG. 5B shows the color ranges CRf and CRb projected on the a*L* plane in which the horizontal axis represents the a* value and the vertical axis the L* value. The graph in FIG. 5C shows the color ranges CRf and CRb projected on the b*L* plane in which the horizontal axis represents the b* value and the vertical axis the L* value.

As illustrated in FIG. 5A, the outgoing maximum color range CRf includes colors in a high-saturation red color range Rr that is not included in the return maximum color range CRb. High-saturation reds in this range can be printed with an outgoing print but not a return print. As illustrated in FIG. 5B, the outgoing maximum color range CRf includes a high-saturation green color range Rg that is not included in the return maximum color range CRb. High-saturation greens in this range can be printed with an outgoing print but not a return print. As illustrated in FIG. 5C, the return maximum color range CRb includes a high-saturation yellow color range Ry that is not included in the outgoing maximum color range CRf. High-saturation yellows in this range can be printed with a return print but not an outgoing print.

Figure 6A:
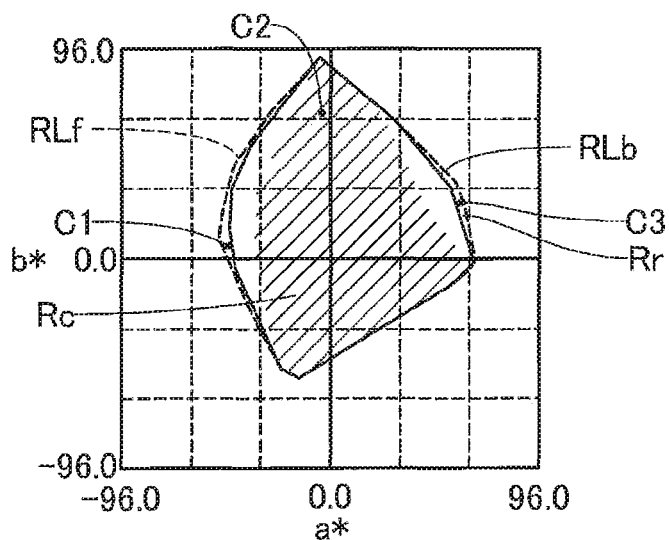
FIG. 6A is a graph showing examples of an outgoing printing color range and a return printing color range projected on the a*b* plane, in which depicted with a dashed line is the outgoing printing color range representing a color range that can be printed according to an outgoing print using an outgoing lookup table, and depicted with a solid line is the return printing color range representing a color range that can be printed according to a return print using a return lookup table.
Figure 6B:
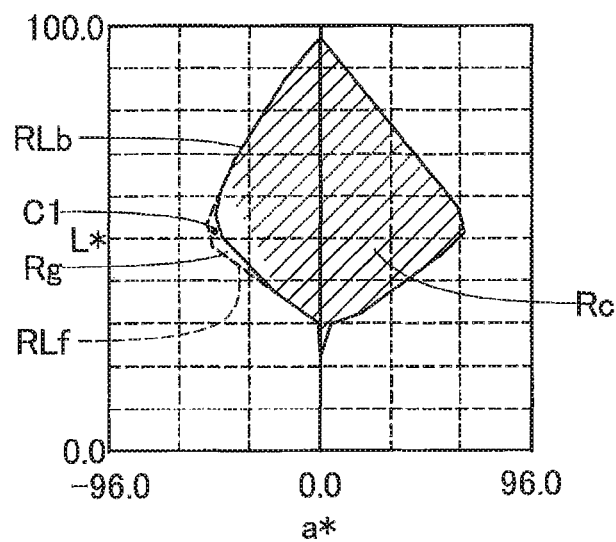
FIG. 6B is a graph showing examples of the outgoing printing color range and the return printing color range projected on the a*L* plane, in which the outgoing printing color range is depicted with a dashed line and the return printing color range is depicted with a solid line.
Figure 6C:
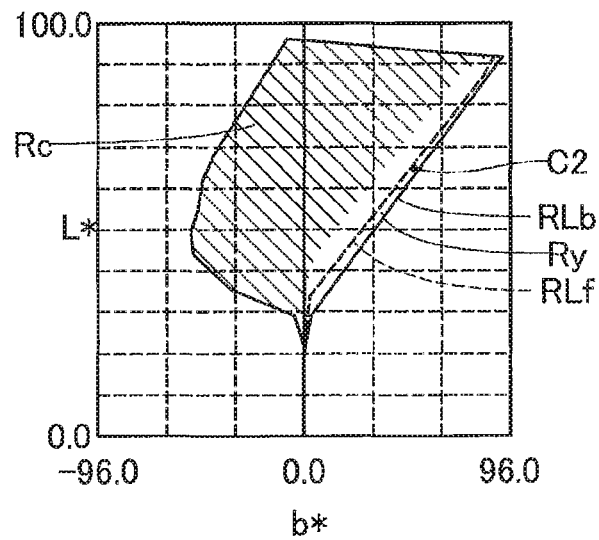
FIG. 6C is a graph showing examples of the outgoing printing color range and the return printing color range projected on the b*L* plane, in which the outgoing printing color range is depicted with a dashed line and the return printing color range is depicted with a solid line.

FIGS. 6A to 6C are graphs showing examples of printing color ranges RLf and RLb that can be printed using respective lookup tables LUTf and LUTb. In the printing process described later, input color values (RGB color values in the present embodiment) representing color values in the image data used for printing are converted to output color values (CMYK color values in the present embodiment) representing color values corresponding to the ink colors. In the following description, the color space of the image data used for printing (the RGB color space in the present embodiment) will be called the input color space (an example of the specific color space of the present disclosure). The color space corresponding to the colors of ink that can be used for printing (the CMYK color space in the present embodiment) will be called the ink color space (an example of the ink color space of the present disclosure). The lookup tables LUTf and LUTb define correlations between the input color values and output color values (i.e., correlations between the input color space and the ink color space). These types of lookup tables LUTf and LUTb are also called color conversion profiles, or simply profiles. The outgoing lookup table LUTf (outgoing color conversion profile and an example of the first profile of the present disclosure) is used for outgoing prints, and the return lookup table LUTb (return color conversion profile and an example of the second profile of the present disclosure) is used for return prints.

The printing color ranges RLf and RLb illustrated in FIGS. 6A to 6C represent the color ranges that can be printed using the respective lookup tables LUTf and LUTb. The printing color ranges RLf and RLb depicted in FIGS. 6A to 6C are projected in the same planes illustrated in respective FIGS. 5A to 5C. The outgoing printing color range RLf is depicted with a dashed line and represents the range of colors that can be printed according to an outgoing print using the outgoing lookup table LUTf. The outgoing printing color range RLf is included in the outgoing maximum color range CRf illustrated in FIGS. 5A to 5C. The return printing color range RLb is depicted with a solid line and represents the range of colors that can be printed according to a return print using the return lookup table LUTb. The return printing color range RLb is included in the return maximum color range CRb illustrated in FIGS. 5A to 5C.

Within a specific input color range, the lookup tables LUTf and LUTb in the present embodiment correlate output color values that produce substantially the same printed colors with the same input color values in order to suppress excessive differences in printed colors between outgoing prints and return prints. The specific input color range is a partial range of colors in the input color space. A color range Rc depicted with shading in FIGS. 6A to 6C is the color range corresponding to this specific input color range and will hereinafter be called the "specific printing color range Rc." In the present embodiment, the specific printing color range Rc is the range that remains after removing the high-saturation color ranges Rr, Rg, and Ry (in FIGS. 5A, 5B, and 5C) at which the outgoing maximum color range CRf and return maximum color range CRb deviate greatly from each other, and their neighboring regions. For colors other than the high-saturation colors in the regions including the high-saturation color ranges Rr, Rg, and Ry and their neighboring regions, the printed colors are substantially the same for the same input color values, irrespective of the direction used for the partial print.

Note that the printed color may differ between an outgoing print and a return print, even when the quantity of each ink color is the same, because the order in which the colors are being overlapped differs, as illustrated in FIG. 4. Put another way, the output color value for a return print may differ from the output color value used in a return print when the printed color is the same. The lookup tables LUTf and LUTb may correlate different output color values for the same input color value within the specific input color range as output color values corresponding to approximately the same printed color.

For colors in or near the high-saturation color ranges Rr, Rg, and Ry (see FIGS. 5A, 5B, and 5C), the lookup tables LUTf and LUTb are configured to print high-saturation colors included in the maximum color ranges CRf and CRb, respectively.

As an example, a first color C1 illustrated in FIGS. 6A and 6B is a high-saturation green that is included in the outgoing printing color range RLf, but not the return printing color range RLb. In other words, the outgoing printing color range RLf includes the first color C1 that can be printed in an outgoing print based on the outgoing lookup table LUTf, but that cannot be printed in a return print based on the return lookup table LUTb. Accordingly, when the direction of the partial print is set to the outgoing direction, high-saturation greens in the color range Rg (see FIG. 5B) can be printed by executing an outgoing print based on the outgoing lookup table LUTf.

A second color C2 illustrated in FIGS. 6A and 6C is a high-saturation yellow that is included in the return printing color range RLb, but not in the outgoing printing color range RLf. In other words, the return printing color range RLb includes the second color C2 that can be printed according to a return print based on the return lookup table LUTb, but that cannot be printed according to an outgoing print based on the outgoing lookup table LUTf. Accordingly, when the direction of the partial print is set to the return direction, high-saturation yellows in the color range Ry (see FIG. 5C) can be printed by executing a return print based on the return lookup table LUTb.

A third color C3 illustrated in FIG. 6A is a high-saturation red that is included in the outgoing printing color range RLf, but not in the return printing color range RLb. In other words, the outgoing printing color range RLf includes the third color C3 that can be printed according to an outgoing print based on the outgoing lookup table LUTf, but that cannot be printed according to a return print based on the return lookup table LUTb. Accordingly, when the direction of the partial print is set to the outgoing direction, high-saturation reds in the color range Rr (see FIG. 5A) can be printed by executing an outgoing print based on the outgoing lookup table LUTf.

In the present embodiment, the direction for a partial print is set according to the colors included in the partial image. FIG. 7 is a table representing an example of the index table 300. The index table 300 defines correlations between color values in the input color space (RGB values in this example) and index values V specifying the preferred direction for the partial print. An index value V of "1" denotes that the outgoing direction is preferred, while an index value V of "−1" indicates that the return direction is preferred. An index value V of "0" indicates that either the outgoing direction or return direction is preferred.

In FIG. 7, a first input color value IV1 specifies a high-saturation green and has a corresponding index value V of "1" (outgoing direction). When an image expressed by the first input color value IV1 is printed in an outgoing print, the printed color is a color within the high-saturation green color range Rg illustrated in FIG. 6B. If an image expressed by the first input color value IV1 were printed according to a return print, the printed color would be a color within the return printing color range RLb illustrated in FIG. 6B.

A second input color value IV2 specifies a high-saturation yellow and has a corresponding index value V of "−1" (return direction). When an image expressed by the second input color value IV2 is printed in a return print, the printed color is a color within the high-saturation yellow color range Ry illustrated in FIG. 6C. If an image expressed by the second input color value IV2 were printed according to an outgoing print, the printed color would be a color within the outgoing printing color range RLf illustrated in FIG. 6C.

A third input color value IV3 specifies a high-saturation red and has a corresponding index value V of "1" (outgoing direction). When an image expressed by the third input color value IV3 is printed in an outgoing print, the printed color is a color within the high-saturation red color range Rr illustrated in FIG. 6A. If an image expressed by the third input color value IV3 were printed according to a return print, the printed color would be a color within the return printing color range RLb illustrated in FIG. 6A.

Thus, the index value V specifies which of the outgoing direction or return direction should be used for printing colors with higher saturation. The index value V is set to "0" when the input color value falls in the specific input color range.

Figure 8:
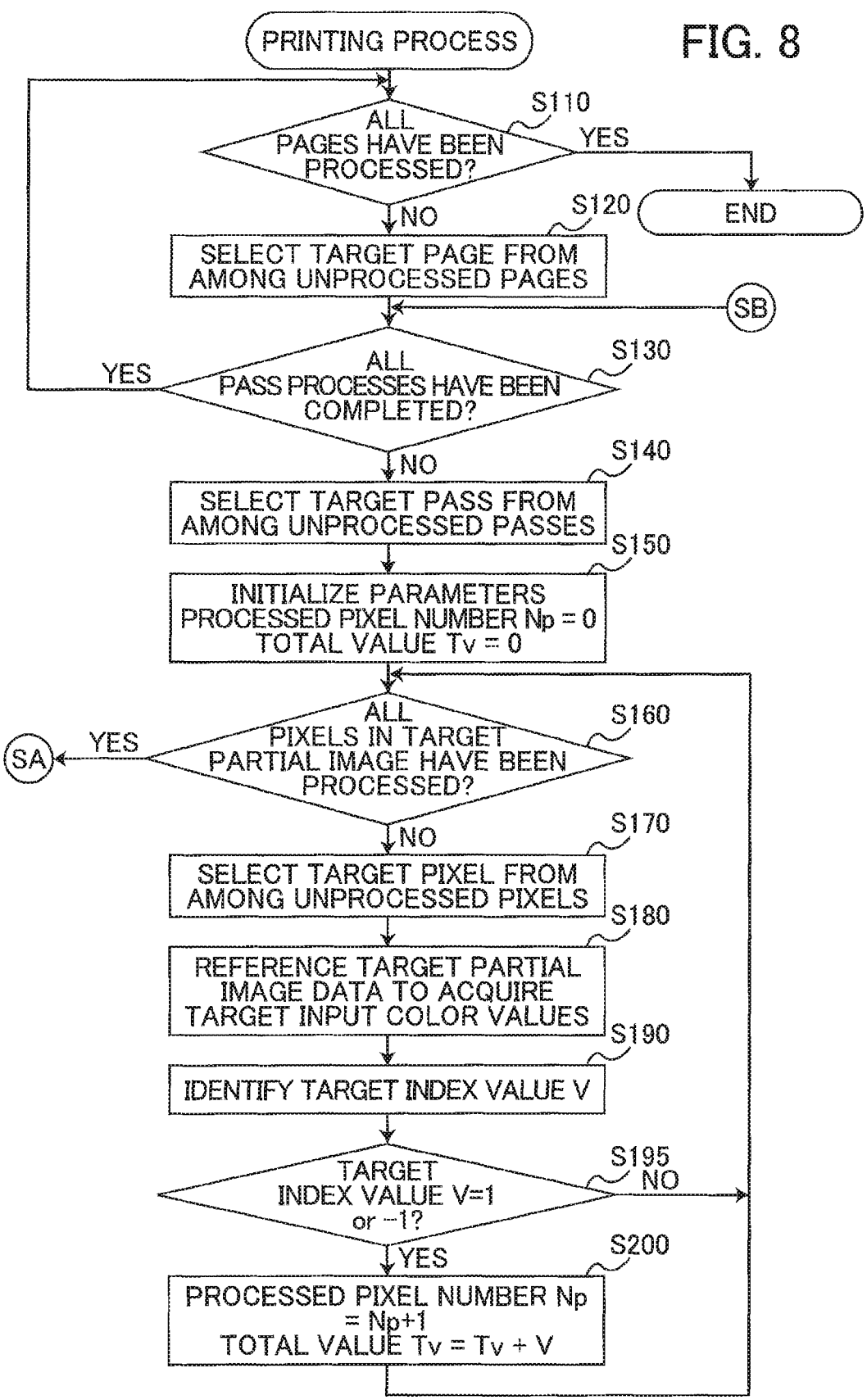
FIG. 8 is a flowchart illustrating steps in part of a printing process executed by the terminal device according to the first embodiment of the present disclosure.
Figure 9:
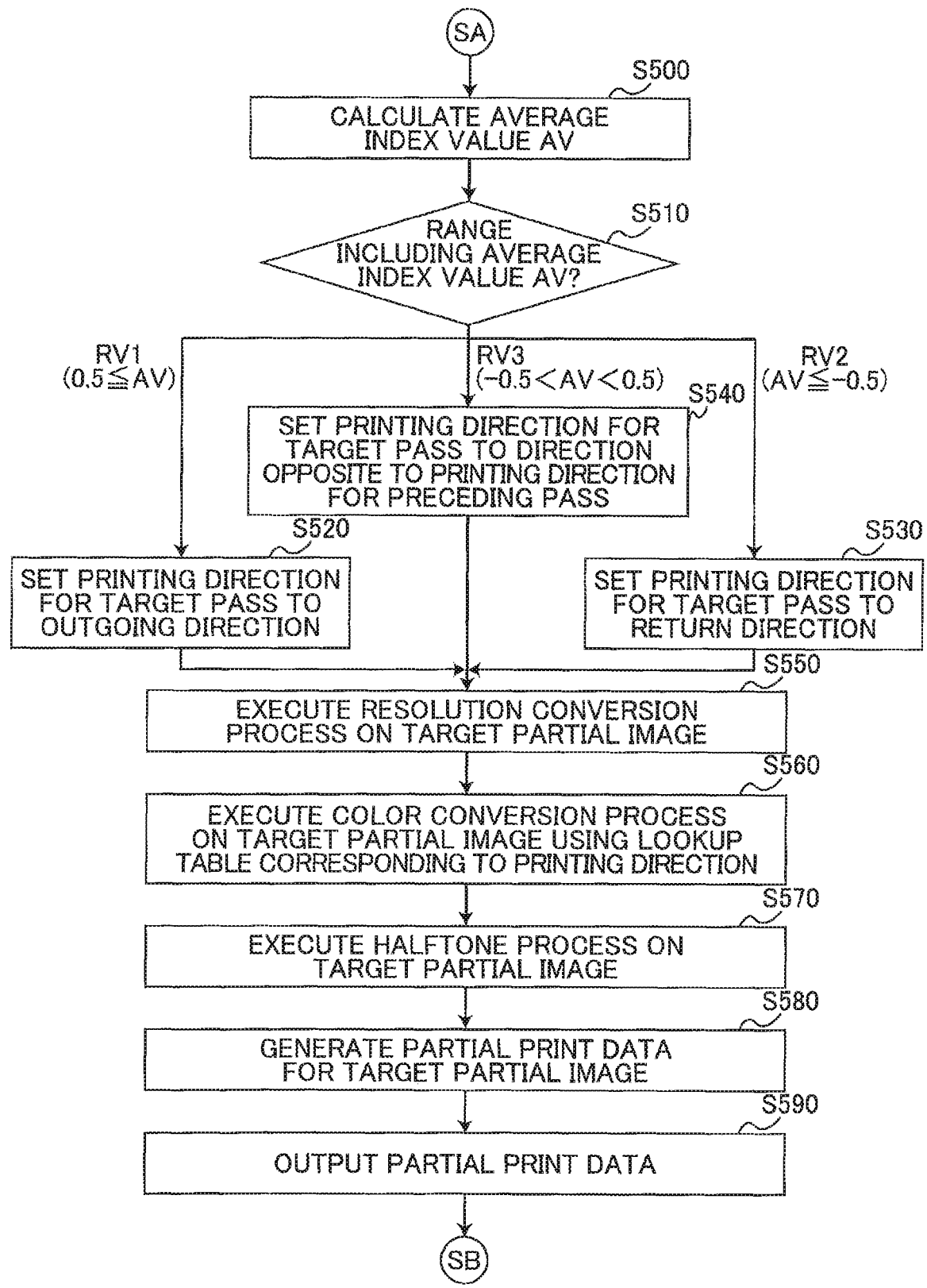
FIG. 9 is a flowchart illustrating steps in remainder of the printing process executed by the terminal device according to the first embodiment of the present disclosure.

FIGS. 8 and 9 are flowcharts illustrating an example of the printing process. The process in FIG. 9 is a continuation of the process in FIG. 8. In the present embodiment, the processor 110 of the terminal device 100 receives a print command from the user. The processor 110 starts the printing process in response to the print command. Any method for inputting the print command may be used. In the present embodiment, the user operates the operating unit 150 to input the print command. The print command includes information specifying image data to be printed. In the following description, the image data specified in the print command will be called image data subjected to printing, or simply subjected image data, and the image represented by the subjected image data will be called the subjected image. Various data may be specified as subjected image data. For example, the user may specify image data stored in the storage device 115 (the non-volatile storage device 130, for example) or image data generated by application software running on the terminal device 100. In the present embodiment, the subjected image data is bitmap data and specifies pixel values for each pixel. The pixel values are expressed as one of 256 gradations from 0 to 255 for each of the components red (R), green (G), and blue (B). When the specified image data has a format other than the bitmap format (Enhanced Metafile (EMF), for example), the processor 110 converts the data format (rasterizes the data, for example) to generate bitmap data and uses the resulting bitmap data as the subjected image data. The processor 110 also analyzes the subjected image data to identify the number N of pages (where N is an integer equal to or greater than one).

In S110 of FIG. 8, the processor 110 determines whether the printing process has been completed for each of the N pages represented by the target image data. When there remain unprocessed pages (S110: NO), in S120 the processor 110 selects the first page among the unprocessed pages to be a target page. The target page is the page that is the current target of processing, and the image represented by the target page will be called the target image.

Figure 10:
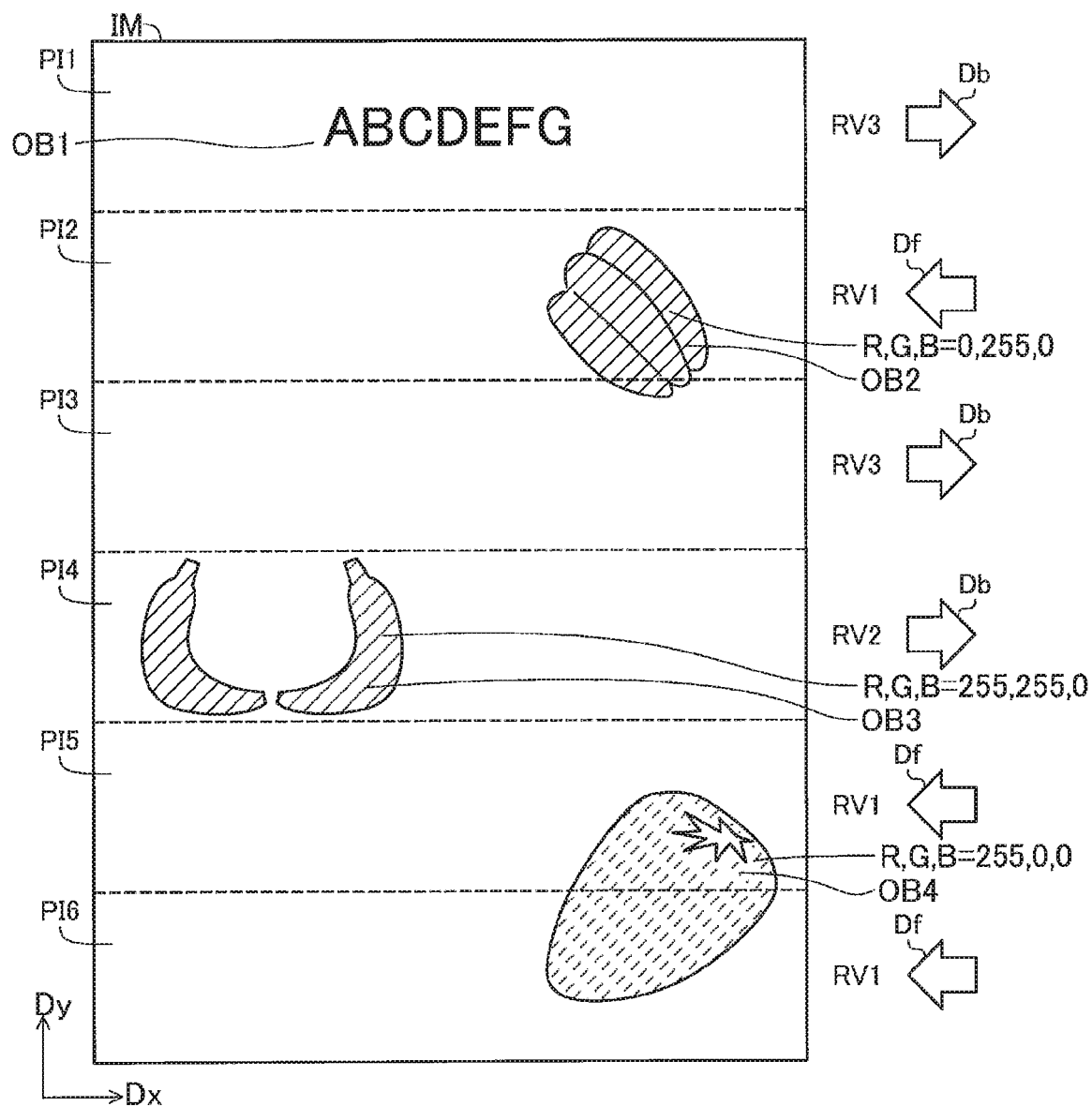
FIG. 10 is a schematic diagram illustrating an example of a target image to be processed by the terminal device of the present disclosure.

FIG. 10 is a schematic diagram illustrating an example of a target image IM. The target image IM in this example includes a white background, and four objects OB1 to OB4. The first object OB1 is an object configured of a black character string. The second object OB2 represents a green bell pepper. A plurality of pixels constituting a portion of the second object OB2 has the RGB values 0, 255, and 0 that represent a high-saturation green. The third object OB3 represents yellow bananas. A plurality of pixels constituting a portion of the third object OB3 has the RGB values 255, 255, and 0, representing a high-saturation yellow. The fourth object OB4 represents a red strawberry. A plurality of pixels constituting a portion of the fourth object OB4 has the RGB values 255, 0, and 0, representing a high-saturation red.

In S130 the processor 110 determines whether all pass processes have been completed for the target page. As described in FIG. 4, the target image is printed in a plurality of partial prints (i.e., pass processes). The processor 110 identifies the total number of passes required to print the target image by dividing the target image into a plurality of partial images having a width corresponding to the nozzle row length D, and identifies the partial image corresponding to each pass beginning from the +Dy edge of the target image and progressing in the −Dy direction.

In the example of FIG. 10, the target image IM is configured of six partial images PI1 to PI6. The first partial image PI1 includes the first object OB1. The second partial image PI2 includes most of the second object OB2. The third partial image PI3 includes a small portion of the second object OB2. The fourth partial image PI4 includes the third object OB3. The fifth partial image PI5 includes approximately half of the fourth object OB4, and the sixth partial image PI6 includes the remaining portion of the fourth object OB4.

When there remain unprocessed passes (S130: NO), in S140 the processor 110 selects the pass corresponding to the partial image farthest to the +Dy side among the one or more unprocessed passes to be the target pass. Here, the target pass is the pass to be subjected to processing. In the following description, the partial image corresponding to the target pass within the target image will be also called the target partial image. In addition, the portion of the target image data that corresponds to the partial print will be called the partial image data, and the partial image data that represents the target partial image will be called the target partial image data.

In S150 the processor 110 initializes parameters. Specifically, the processor 110 initializes a processed pixel number Np to 0 and a total value Tv to 0. As described later, the processed pixel number Np denotes the number of pixels in the target partial image whose index value V is "1" or "4", and the total value Tv denotes the sum of the index values V of the pixels in the target partial image whose index value V is "1" or "−1".

In S160 the processor 110 determines whether all pixels in the target partial image have been processed. When there remain unprocessed pixels (S160: NO), in S170 the processor 110 selects the first unprocessed pixel from among the plurality of pixels in the target partial image to be the target pixel, i.e., the pixel to be processed.

In S180 the processor 110 references the portion of the target image data corresponding to the target partial image, i.e., the target partial image data to identify the input color values (RGB values in this case) for the target pixel (hereinafter called the target input color values). In S190 the processor 110 references the index table 300 (see FIG. 7) to identify the index value V corresponding to the target input color values (hereinafter called the target index value V). In S195 the processor 110 determines whether the target index value V is one of "1" and "−1". In other words, in S195 the processor 110 determines whether the target index value V is a non-zero value. When the target index value V is "1" or "−1" (S195: YES), in S200 the processor 110 adds the target index value V to the total value Tv and increments the processed pixel number Np by one. Thereafter, the processor 110 returns to S160. When the target index value V is "0" (S195: NO), the processor 110 skips the process in S200 and returns to S160.

When all pixels in the target partial image have been processed (S160: YES), in S500 of FIG. 9 the processor 110 calculates an average index value AV. In the present embodiment, the average index value AV is calculated as AV=Tv/Np. Thus, the average index value AV is the average of the index values V of pixels whose index value V is "1" or "−1". Pixels whose index value V is "0" are excluded from the calculation of the average index value AV.

In S510 the processor 110 identifies the range that includes the average index value AV from among three predetermined ranges. In the present embodiment, the three ranges are a first value range RV1 (0.5≤AV), a second value range RV2 (AV≤−0.5), and a third value range RV3 between the first value range RV1 and second value range RV2 (−0.5<AV<0.5). The first value range RV1 specifies a range in which the number of pixels in the target partial image with colors suited for an outgoing print is sufficiently larger than the number of pixels in the target partial image with colors suited for a return print. The second value range RV2 specifies a range in which the number of pixels in the target partial image with colors suited for a return print is sufficiently larger than the number of pixels in the target partial image with colors suited for an outgoing print. The third value range RV3 specifies a range in which the difference between the number of pixels in the target partial image with colors suited for an outgoing print and the number of pixels in the target partial image with colors suited for a return print is small.

When the first value range RV1 includes the average index value AV, in S520 the processor 110 sets the printing direction for the target partial image (i.e., the target pass) to the outgoing direction and subsequently advances to S550. When the second value range RV2 includes the average index value AV, in S530 the processor 110 sets the printing direction for the target partial image to the return direction and subsequently advances to S550. When the third value range RV3 includes the average index value AV, in S540 the processor 110 sets the printing direction for the target partial image to the direction opposite the printing direction for the preceding partial image (i.e., the preceding pass), and subsequently advances to S550. As will be described later, the process in S140 of FIG. 8 through S540 of FIG. 9 for setting the printing direction is performed for each of the partial images (i.e., for each pass).

The ranges identified in S510 of FIG. 9 and the printing directions set in any of S520, S530, and S540 of FIG. 9 are specified to the right of the target image IM in FIG. 10. For the first partial image PH, the average index value AV is included in the third value range RV3 since there are few pixels whose color has an index value V of "1" or "−1" (high-saturation colors in this case). When the average index value AV of the first partial image PI1 on the initial edge of the target image IM is in the third value range RV3, in S540 the processor 110 sets the printing direction for the first partial image PH to a predetermined direction (the return direction Db in this case).

For the second partial image PI2, the average index value AV is included in the first value range RV1 since the plurality of pixels representing the second object OB2 have an index value V of "1". Hence, the printing direction for the second partial image PI2 is set to the outgoing direction Df in S520.

In the third partial image PI3, the average index value AV is included in the third value range RV3 because there are few pixels whose colors have an index value V of "1" or "−1". Therefore, the printing direction is set to the direction opposite the printing direction for the preceding second partial image PI2. In this case, the printing direction for the preceding second partial image PI2 is the outgoing direction Df, so the processor 110 sets the printing direction for the third partial image PI3 to the return direction Db.

For the fourth partial image PI4, the average index value AV is included in the second value range RV2 since the plurality of pixels representing the third object OB3 have an index value V of "−1". Accordingly, the printing direction for the fourth partial image PI4 is set to the return direction Db.

For the fifth partial image PI5, the average index value AV is included in the first value range RV1 since the plurality of pixels representing the fourth object OB4 have an index value V of "1". Accordingly, the printing direction for the fifth partial image PI5 is set to the outgoing direction Df.

For the sixth partial image PI6, the average index value AV is included in the first value range RV1 since the plurality of pixels representing the fourth object OB4 h have an index value V of "1". Accordingly, the printing direction for the sixth partial image PI6 is set to the outgoing direction Df.

In this way, a printing direction is set for each of the partial images PI2 to PI6 in order to print the objects OB2, OB3, and OB4 in high-saturation colors.

In S550 of FIG. 9, the processor 110 executes a resolution conversion process on the target partial image. The resolution conversion process is performed to convert the resolution of the subjected image data (and particularly the target partial image data) to a predetermined printing resolution.

In S560 the processor 110 executes a color conversion process on the target partial image. Here, the processor 110 uses the outgoing lookup table LUTf or return lookup table LUTb corresponding to the printing direction set in S510 to S540 to convert the color values for each pixel in the target partial image resulting from the resolution conversion in S550 to color values in the ink color space. In other words, in S560 the processor 110 converts the color values for each pixel in the target partial image using the outgoing lookup table LUTf or return lookup table LUTb corresponding to the printing direction set for the target partial image.

In S570 the processor 110 executes a halftone process on the target partial image. The halftone process may be implemented using any of various methods, such as an error diffusion method or a method using dither matrices. In S580 the processor 110 uses data representing the results of the halftone process to generate partial print data, i.e., print data for the target partial image. Print data is data in a format that can be interpreted by the MFP 200 (the control circuit 490 of the print execution unit 400 in the present embodiment). The partial print data generated in S580 includes image data representing the results of the halftone process, data specifying the printing direction, and data specifying the feed amount for the sheet PM following the partial print (a distance equivalent to the nozzle row length D in this case).

In S590 the processor 110 outputs the partial print data to the MFP 200. Upon receiving the partial print data, the processor 210 of the MFP 200 outputs the partial print data to the print execution unit 400. The print execution unit 400 then executes a partial print to print the target partial image according to the received partial print data. The printing direction for the partial print is the direction set in S510 to S540, and is specified by the data included in the received partial print data.

After outputting the partial print data in S590, the processor 110 returns to S130 of FIG. 8. In this way, the processor 110 executes the process in S140 of FIG. 8 through S590 of FIG. 9 for all passes. When all passes have been processed (S130: YES), the processor 110 returns to S110. In this way, the processor 110 executes the process in S120 of FIG. 8 through S590 of FIG. 9 for all pages. When all pages have been processed (S110: YES), the processor 110 ends the printing process.

As described above, the print execution unit 400 in the present embodiment (see FIGS. 1 and 2) is provided with a plurality of components including the print head 410, main scanning unit 430, and conveying unit 440. The print head 410 (see FIG. 3) has a plurality of nozzles NZ for ejecting ink in the colors KYCM. Specifically, the print head 410 has a black nozzle row NK, a yellow nozzle row NY, a cyan nozzle row NC, and a magenta nozzle row NM. The nozzle rows NK, NY, NC, and NM are juxtaposed in the main scanning direction. The main scanning unit 430 (see FIG. 2) executes a main scan for moving the print head 410 in the main scanning direction relative to the sheet PM. The conveying unit 440 executes a sub scan for moving the sheet PM relative to the print head 410 in the sub scanning direction (also called the conveying direction) that intersects the main scanning direction. The main scanning unit 430 is an example of the first scanner of the present disclosure, and the conveying unit 440 is an example of the second scanner of the present disclosure. As described with reference to FIG. 4 and the like, the print execution unit 400 performs a printing operation by repeatedly and alternately executing a partial print to form dots on the sheet PM using the print head 410 while performing a main scan, and a sub scan.

The non-volatile storage device 130 (see FIG. 1) stores the outgoing lookup table LUTf and the return lookup table LUTb. The outgoing lookup table LUTf correlates a plurality of input color values in the input color space (the RGB color space in this example) with a plurality of output color values in an ink color space (the CMYK color space in this example) that includes a plurality of component values corresponding to the colors of ink. The ink color space has a first color range corresponding to the outgoing printing color range RLf (see FIGS. 6A to 6C) in which are distributed output color values correlated by the outgoing lookup table LUTf. The return lookup table LUTb correlates a plurality of input color values in the input color space with a plurality of output color values in the ink color space. Here, the ink color space has a second color range corresponding to the return printing color range RLb (see FIGS. 6A to 6C) in which are distributed output color values correlated by the return lookup table LUTb.

As described in FIGS. 6A and 6B, the first color range (i.e., the outgoing printing color range RLf) is a color range that includes a first color value representing the first color C1. The first color C1 is a color that can be printed by a partial print in the outgoing direction Df (outgoing print) using image data based on the outgoing lookup table LUTf. The first color C1 is a color that cannot be printed by a partial print in the return direction Db (return print) using image data based on the return lookup table LUTb. The outgoing direction Df is an example of the first direction of the present disclosure, the outgoing print is an example of the first-direction partial print of the present disclosure, and the first color C1 is an example of the first color and the fourth color of the present disclosure.

As described in FIG. 6C, the second color range (i.e., the return printing color range RLb) is a color range that includes a second color value representing the second color C2. The second color C2 is a color that can be printed by a partial print in the return direction Db using image data based on the return lookup table LUTb. The second color C2 is a color that cannot be printed by a partial print in the outgoing direction Df using image data based on the outgoing lookup table LUTf. The return direction Db is an example of the second direction of the present disclosure, the return print is an example of the second-direction partial print of the present disclosure, and the second color C2 is an example of the second color and the third color of the present disclosure.

As described in FIGS. 8 and 9, the processor 110 executes a generation process (S550 to S580) that includes a color conversion process (S550 and S560) on partial image data for each of a plurality of partial prints in order to generate partial print data corresponding to the partial image data. The partial image data is the portion of the target image data expressed in the input color space that corresponds to the partial print. As described in S560 of FIG. 9, the color conversion process is executed using the outgoing lookup table LUTf when the printing direction for the partial print is the outgoing direction Df parallel to the main scanning direction, and is executed using the return lookup table LUTb when the printing direction for the partial print is the return direction Db opposite the outgoing direction Df. Thereafter, in S590 the processor 110 outputs the partial print data to the MFP 200.

Through the above processes, the first color C1, which cannot be printed in a partial print in the return direction Db, can be printed when executing a partial print in the outgoing direction Df. Similarly, the second color C2, which cannot be printed in a partial print in the outgoing direction Df, can be printed when executing a partial print in the return direction Db. Accordingly, this method can relax restrictions on the range of printable colors. The partial print in the outgoing direction Df is an example of the first-direction partial print of the present disclosure, and the partial print in the return direction Db is an example of the second-direction partial print of the present disclosure.

As described in S160 of FIG. 8 through S540 of FIG. 9, the processor 110 sets the printing direction for a partial print using color values specified in the target image data. In S550 the processor 110 executes a color conversion process using a lookup table for the set printing direction. Accordingly, the processor 110 can suitably print an image specified by the target image data while relaxing restrictions on the range of printable colors.

As described in S130 of FIG. 8 through S540 of FIG. 9, the processor 110 sets the printing direction for each of a plurality of partial prints to one of the outgoing direction Df and return direction Db using the color values specified in partial image data for the corresponding partial print. Accordingly, the processor 110 can suitably print an image specified by the target image data while relaxing restrictions on the range of printable colors.

As described in FIGS. 1 and 7, the storage device 115 (the non-volatile storage device 130 in this case) stores the index table 300. The index table 300 specifies predetermined correlations between color values in an input color space (RGB values in this case) with index values V for printing directions. In S160 to S190 of FIG. 8, the processor 110 uses the index table 300 to identify the index value V corresponding to the color values of each pixel in partial image data for a partial print. In S195 to S200 of FIGS. 8 and S500 of FIG. 9, the processor 110 calculates an evaluation value (the average index value AV in the present embodiment) for the partial print using index values V for a plurality of pixels included in a partial image. The processor 110 sets the printing direction for the partial print to the outgoing direction Df (S520) when the average index value AV falls in the first value range RV1, and sets the printing direction to the return direction Db (S530) when the average index value AV falls in the second value range RV2. If the average index value AV falls in the third value range RV3 between the first value range RV1 and second value range RV2, the processor 110 sets the printing direction for the partial print to the direction opposite the printing direction used for the preceding partial print (S540). By setting the printing direction for each partial print on the basis of the average index value AV of index values V corresponding to color values for a plurality of pixels specified in the partial image data, the processor 110 can suitably print an image represented by the subjected image data while relaxing restrictions on the range of printable colors.

B. Second Embodiment

FIG. 11 is a flowchart illustrating steps in part of the printing process according to the second embodiment. In the second embodiment, as described later, step S150, S195 and S200 of FIG. 8 are omitted, the target index value V identified in S190 is stored, and step S500 of FIG. 9 is replaced with the process illustrated in FIG. 11. All other steps in the printing process according to the second embodiment are identical to those corresponding steps in FIGS. 8 and 9. In the second embodiment, the processor 110 calculates the average index value AV, which is an example of the evaluation value calculated using the index values V, in consideration of block evaluation values calculated for each of a plurality of blocks constituting the partial image.

Figure 12A:
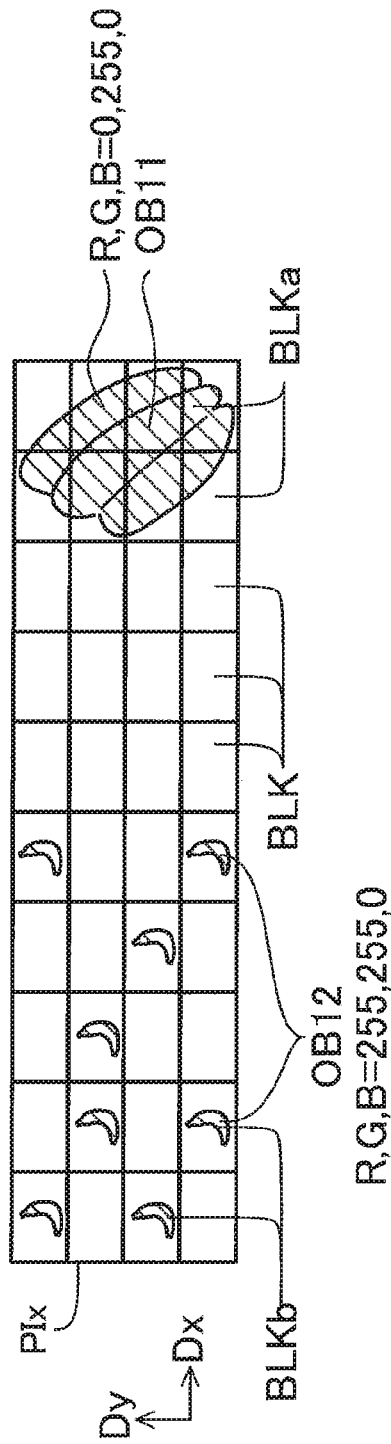
FIG. 12A is a schematic diagram illustrating an example of a partial image, in which the partial image is divided into a plurality of blocks arranged in a matrix configuration.

When the processor 110 determines in S160 of FIG. 8 that all pixels in the target partial image have been processed (S160: YES), in S210 of FIG. 11, the processor 110 determines whether all blocks in the target pass have been processed. FIG. 12A is a schematic diagram illustrating an example of a single partial image PIx. This partial image PIx is divided into a plurality of rectangular blocks BLK. The blocks BLK are arranged in a matrix configuration having rows extending in the Dx direction and columns in the Dy direction. The shape, size, and arrangement of the blocks BLK in the partial image are predetermined.

The partial image PIx represents a white background, one large first object OB11, and a plurality of small second objects OB12. The first object OB11 represents a green bell pepper. A plurality of pixels constituting a portion of the first object OB11 has the RGB values 0, 255, and 0, specifying a high-saturation green. The first object OB11 is rendered by a plurality of blocks BLK.

The second objects OB12 represent yellow bananas. A plurality of pixels constituting a portion of each second object OB12 has the RGB values 255, 255, and 0, specifying a high-saturation yellow. The second objects OB12 are smaller than a single block BLK, and each second object OB12 is rendered by a single block BLK.

Returning to FIG. 11, if there remain any unprocessed blocks (S210: NO), in S220 the processor 110 selects one unprocessed block BLK from among the plurality of blocks BLK in the target pass to be the target block, i.e., the block to be subjected to processing. In S230 the processor 110 initializes parameters. Specifically, the processor 110 initializes a processed pixel number Np to zero and a total value Tv to zero. Note that steps S150, S195 and S200 of FIG. 8 are omitted in the second embodiment, as described above. In the second embodiment, the processed pixel number Np denotes the number of pixels in the target block whose index value V is "1" or "4", and the total value Tv denotes the sum of the index values V of the pixels in the target block whose index value V is "1" or "−1".

In S240 the processor 110 determines whether all pixels in the target block have been processed. When there remain unprocessed pixels (S240: NO), in S250 the processor 110 selects one unprocessed pixel from among the plurality of pixels in the target block to be the target pixel, i.e., the pixel subjected to processing. In S260 the processor 110 determines whether the target index value V (i.e., the index value V for the target pixel) is one of "1" and "−1". When the target index value V is "1" or "−1" (S260: YES), in S265 the processor 110 adds the target index value V to the total value Tv and increments the processed pixel number Np by one. The processor 110 subsequently returns to S240. When the target index value V is "0" (S260: NO), the processor 110 skips the process in S265 and returns to S240.

Note that the target index value V has already been identified in S190 of FIG. 8. In S190 of the present embodiment, as described above, the processor 110 stores data in the storage device 115 (the volatile storage device 120, for example) indicating a correlation between the identified index value V and a pixel identifier (pixel position, for example). In S260 the processor 110 references this correlation to identify the target index value V for the target pixel. Alternatively, in the present embodiment, the processes in S180 and S190 of FIG. 8 may be performed at the timing between S250 and S260 of FIG. 11. In that case, the processes of S170 to S200 in FIG. 8 are omitted.

When all pixels in the target block have been processed (S240: YES), in S270 the processor 110 determines whether the processed pixel number Np is greater than or equal to a predetermined threshold Tp. The threshold Tp is set to a value sufficiently larger than zero and smaller than the number of pixels in a single block BLK.

For example, each of blocks BLKa representing part of the first object OB11 in FIG. 12A has a plurality of pixels constituting the first object OB11. The index value V for these pixels constituting the first object OB11 is "1". Here, the number of pixels having an index value V of "1" (i.e., the processed pixel number Np) is greater than the threshold Tp. On the other hand, in blocks BLKb representing the second objects OB12, the pixels constituting the second objects OB12 have an index value V of "−1". However, since the second objects OB12 are small in size, the number of pixels having an index value V of "−1" (i.e., the processed pixel number Np) is smaller than the threshold Tp.

When the processed pixel number Np is greater than or equal to the threshold Tp (S270: YES), in S280 the processor 110 calculates the average value of index values V in the target block (hereinafter called the block evaluation value BV). In the present embodiment, the block evaluation value BV is calculated according to the equation BV=Tv/Np. Thus, the block evaluation value BV is the average value of index values V for pixels having an index value V of "1" or "−1". Pixels whose index value V is "0" are excluded from this calculation of the block evaluation value BV. In the example of the partial image PIx in FIG. 12A, the processor 110 calculates the block evaluation value BV in S280 when the target block is a block BLKa representing part of the first object OB11 since Np≥Tp.

When the processed pixel number Np is less than the threshold Tp (S270: NO), in S290 the processor 110 sets the block evaluation value BV for the target block to zero. Using the example of the partial image PIx in FIG. 12A, the processor 110 sets the block evaluation value BV to zero in S290 when the target block is a block BLKb representing one of the second objects OB12 since Np<Tp.

Figure 12B:
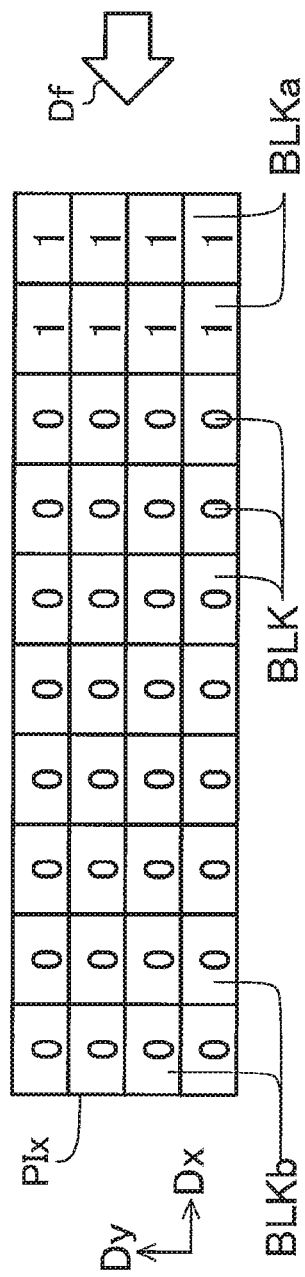
FIG. 12B is a schematic diagram illustrating an example of block evaluation values respectively set for the plurality of blocks in the partial image illustrated in FIG. 12A.

FIG. 12B is a schematic diagram illustrating an example of block evaluation values BV set for the plurality of blocks BLK in the partial image PIx. As illustrated in the drawing, the block evaluation value BV is set to a value other than zero (one in this example) for blocks BLKa representing the first object OB11. Note that the block evaluation value BV may be a value other than one, for example zero, as a result of calculation in S280. The block evaluation value BV is set to zero for blocks BLKb representing the second objects OB12.

In S280 and S290, the processor 110 stores block data in the storage device 115 (the volatile storage device 120, for example) indicating a correlation between the identified (calculated in S280 or set in S290) block evaluation value BV and a block BLK identifier (a block BLK position, for example). The processor 110 references this stored block data in subsequent processes.

After identifying the block evaluation value BV in S280 or S290, the processor 110 returns to S210. When all blocks BLK in the target pass have been processed (S210: YES), in S295 the processor 110 calculates the average index value AV for valid blocks. A valid block is a block BLK having a non-zero block evaluation value BV. In other words, the valid block is a block BLK having a processed pixel number Np greater than or equal to the threshold Tp and having non-zero total value Tv. The average index value AV is calculated to be the average of index values V for all pixels having non-zero index values V among the plurality of pixels in the valid blocks. In the partial image PIx of FIGS. 12A and 12B, the processor 110 calculates the average value of index values V for all pixels possessing a non-zero index value V among the plurality of pixels included in the plurality of blocks BLKa having non-zero index values V. Pixels whose index value V is "0" are excluded from the calculation of the average index value AV. Pixels representing the second objects OB12 are also excluded from the calculation of the average index value AV.

After calculating the average index value AV, the processor 110 advances to S510 of FIG. 9. The remaining process from S510 is identical to the process in the first embodiment. In the example of FIGS. 12A and 12B, the processor 110 calculates the average index value AV of valid blocks using the blocks BLKa representing the green first object OB11. Since the index value V is "1" for all pixels representing the first object OB11, the average index value AV is included in the first value range RV1. Hence, the direction for the partial print is set to the outgoing direction Df.

As described above, in S160 to S190 of FIG. 8 in the second embodiment, the processor 110 uses the index table 300 to identify the index value V corresponding to color values for each of the plurality of pixels specified in partial image data for a partial print. In S210 to S290 of FIG. 11, the processor 110 calculates the block evaluation value BV for each of the plurality of blocks BLK arranged in the partial image represented by the partial image data using the index values V for the plurality of pixels in the block BLK.

In S295 the processor 110 calculates the average index value AV as the evaluation value for the partial image using the index values V for the plurality of pixels in the valid blocks specified on the basis of the block evaluation value BV for each of the plurality of blocks BLK. Subsequently, in S510 to S540 of FIG. 9 the processor 110 sets the printing direction for the partial print on the basis of the average index value AV. Through this process, the processor 110 can mitigate the effects that small regions have on setting the printing direction.

One particular aspect of the second embodiment is that blocks BLK having a small processed pixel number Np, which denotes the number of pixels having a non-zero index value V, are excluded from the calculation of the average index value AV (S270 to S295 of FIG. 11). The processor 110 identifies blocks BLK having a processed pixel number Np greater than or equal to the threshold Tp (S270: YES) and uses the index values V for pixels in the identified blocks BLK to calculate the evaluation value (the average index value AV in this example; S270, S280, S290, and S295). Thus, blocks BLK representing small objects are excluded from the determination for the printing direction. Hence, the printing direction is set to a direction suited for the colors in larger, more noticeable objects. For the example of the partial image PIx in FIG. 12A, the high-saturation green of the first object OB11 is conspicuous since the first object OB11 is large. On the other hand, the high-saturation yellow of the second objects OB12 is less conspicuous since the second objects OB12 are small. In the present embodiment, the influence of blocks representing the small second objects OB12 is eliminated from the process of setting the printing direction. Therefore, the printing direction is set to a direction suited to the color of the larger, more conspicuous first object OB11. Here, the threshold Tp may be set in advance through experimentation using objects that are sufficiently small to be excluded from determining the printing direction.

C. Third Embodiment

Figure 13:
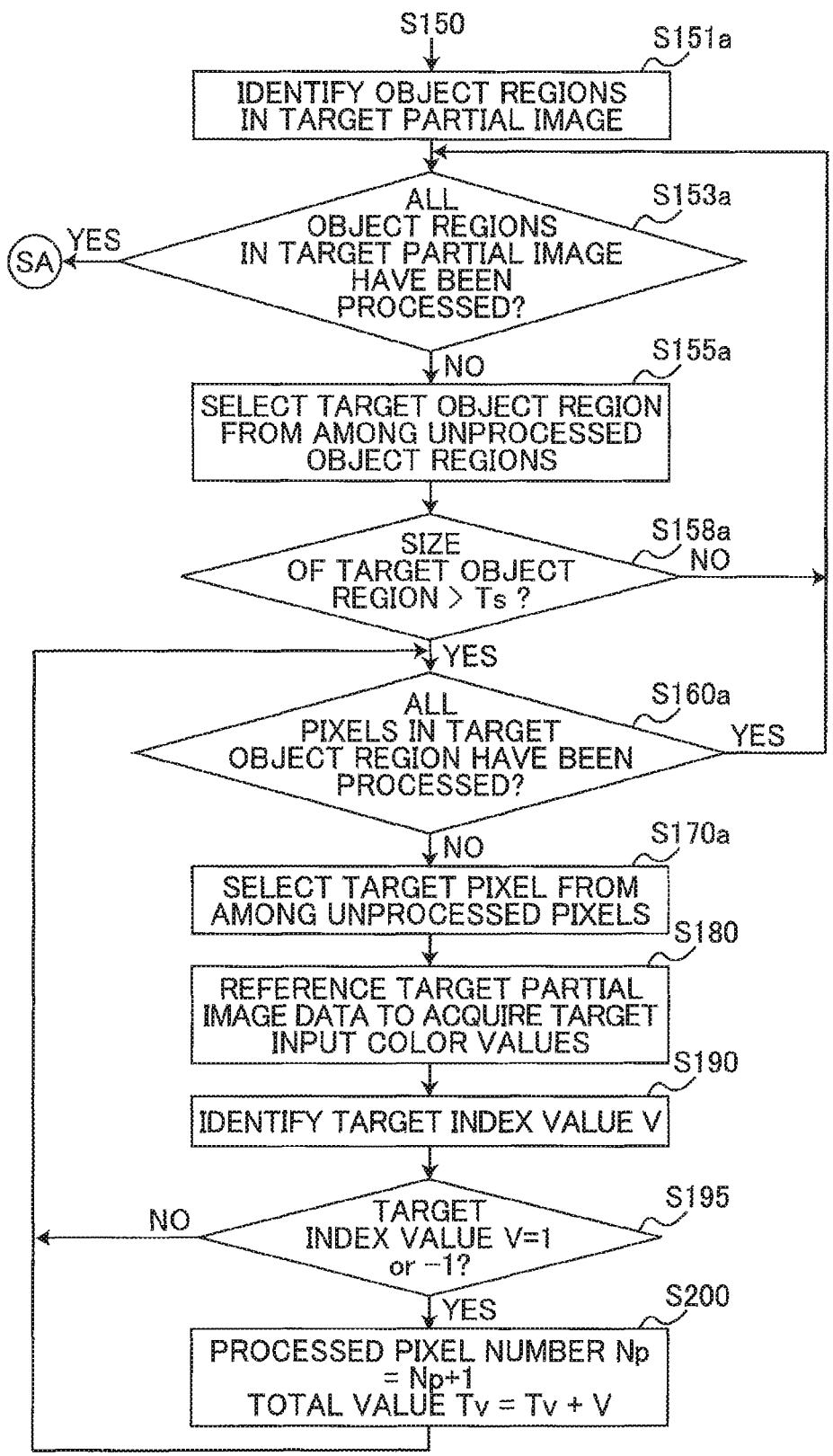
FIG. 13 is a flowchart illustrating steps in part of a printing process executed by a terminal device according to a third embodiment of the present disclosure.

FIG. 13 is a flowchart illustrating steps in a portion of the printing process according to a third embodiment. In the third embodiment, steps S160 to S200 of FIG. 8 are replaced by the process illustrated in FIG. 13. All other steps in the printing process according to the third embodiment are identical to the corresponding steps in FIGS. 8 and 9. In the third embodiment, the processor 110 identifies object regions representing objects in the partial image and calculates evaluation values based on the plurality of pixels in each object region.

Figure 14A:
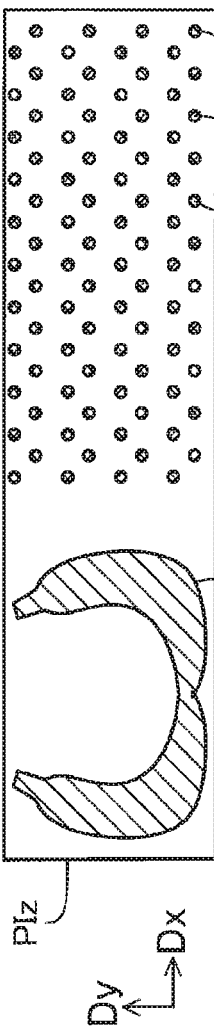
FIG. 14A is a schematic diagram illustrating an example of a partial image, in which a single large object and multiple small objects are included.

Following S150 of FIG. 8, in S151a of FIG. 13 the processor 110 identifies object regions in the target partial image for the target pass. FIG. 14A is a schematic diagram illustrating an example of one partial image PIz. The partial image PIz includes a white background, a single large object OB21, and multiple small objects OB22. The large object OB21 is an object representing yellow bananas. A plurality of pixels constituting part of the large object OB21 has the RGB values 255, 255, and 0, representing a high-saturation yellow. The small objects OB22 are objects representing green circles. A plurality of pixels constituting part of each small object OB22 has the RGB values 0, 255, and 0, representing a high-saturation green.

Any of various processes for identifying object regions by analyzing partial image data may be employed to identify the regions representing the objects OB21 and OB22. For example, the processor 110 may execute a labeling process to identify object regions. Specifically, the processor 110 sorts the plurality of pixels in the target partial image into background pixels and object pixels. Background pixels are pixels having the background color (for example, a color within a predetermined range that includes white), while objects pixels are pixels having other colors. Next, the processor 110 identifies regions having one or more contiguous object pixels as single object regions. In the partial image PIz of FIG. 14A, the region representing the large object OB21 is identified as a single object region. Additionally, each region specifying one of the small objects OB22 is identified as a discrete object region.

In S153a the processor 110 determines whether all object regions in the target partial image have been processed. When there remain unprocessed object regions (S153: NO), in S155a the processor 110 selects one unprocessed object region from among the object regions in the target partial image to be the target object region, i.e., the object region to be processed. In S158a the processor 110 determines whether the target object region has a size larger than a predetermined size threshold Ts. In the present embodiment, the size of an object region is specified as its number of pixels. The size threshold Ts is a value greater than zero and may be set in advance through experimentation using objects that are sufficiently small to be excluded from determining the printing direction.

If the size of the current object region is less than or equal to the size threshold Ts (S158a: NO), the processor 110 returns to S153a.

However, if the size of the target object region is greater than the size threshold Ts (S158a: YES), in S160a the processor 110 determines whether all pixels in the target object region have been processed. If there remain unprocessed pixels (S160a: NO), in S170a the processor 110 selects one unprocessed pixel from among the plurality of pixels in the target object region to be the target pixel, i.e., the pixel to be processed. Subsequently, the processor 110 executes the same steps S180, S190 and S195 described in FIG. 8. When the target index value V for the target pixel in the target object region is a non-zero value (S195: YES), in S200 the processor 110 updates the total value Tv and processed pixel number Np, and returns to S160a. When the target index value V for the target pixel in the target object region is zero (S195: NO), the processor 110 does not update the total value Tv and processed pixel number Np, and returns to S160a.

Once all pixels in the target object region have been processed (S160a: YES), the processor 110 returns to S153a.

After all object regions in the target partial image have been processed (S153a: YES), the processor 110 advances to S500 of FIG. 9 and executes the process beginning from S500 described in the first embodiment.

In S151a of FIG. 13 of the third embodiment, the processor 110 identifies object regions including objects in the partial image represented by the partial image data. In S153a to S200 of FIGS. 13 and S500 of FIG. 9, the processor 110 calculates an evaluation value (the average index value AV in the present embodiment) using the index value V for each pixel in the identified object region. Subsequently, in S510 to S540 of FIG. 9, the processor 110 uses this average index value AV to set the printing direction for the partial print. Through this process, the processor 110 can set the printing direction to a direction suited to the object region.

A particular feature of the present embodiment is that object regions of a small size are excluded from the calculation of the average index value AV (S158a of FIG. 13) for each partial image. Here, the processor 110 identifies object regions having a size larger than the size threshold Ts (S158a: YES) and uses the index value V for each pixel in the identified object region to calculate an evaluation value (the average index value AV in this example; S153a to S200 of FIGS. 13 and S500 of FIG. 9). Thus, small object regions are not used for setting the printing direction, enabling the printing direction to be set to a direction suitable for colors in the larger, more noticeable object regions.

Figure 14B:
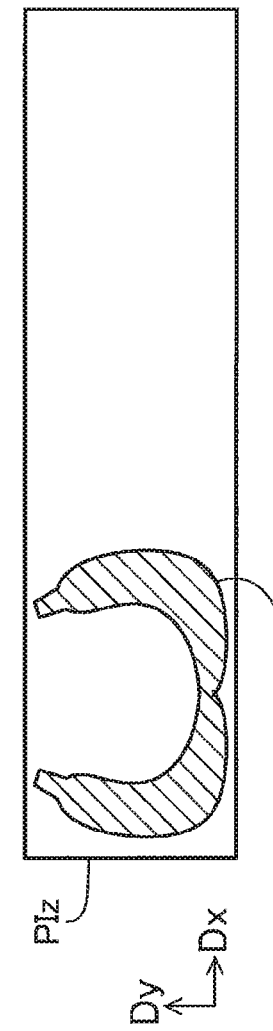
FIG. 14B is a schematic diagram illustrating an example of an object region in the partial image illustrated in FIG. 14A used to calculated an average index value.

FIG. 14B illustrates the object region in the partial image PIz of FIG. 14A used to calculate the average index value AV. As described above, the regions of the multiple small objects OB22 are not used in calculating the average index value AV, and only the region for the large object OB21 is used when calculating the average index value AV. As a result, the processor 110 can set the printing direction to the return direction Db, which is suitable for the color of the large and more noticeable object OB21.

Figure 14C:
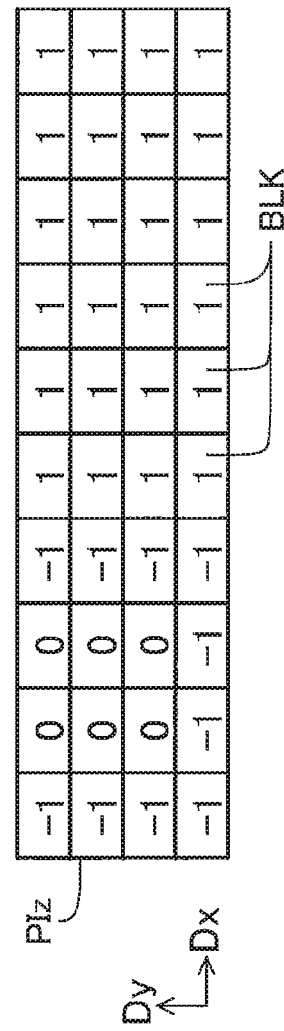
FIG. 14C is a schematic diagram illustrating an example of block evaluation values set for a plurality of blocks in the partial image illustrated in FIG. 14A.

If the block evaluation value BV for each of the plurality of blocks BLK were used as described in the second embodiment, the multiple small objects OB22 could influence how the printing direction is set. FIG. 14C is a schematic diagram illustrating an example of block evaluation values BV for the plurality of blocks BLK in the partial image PIz. In the examples of FIGS. 14A and 14C, a single block BLK represents multiple small objects OB22. Thus, the processed pixel number Np for the single block BLK may exceed the threshold Tp (S270: YES in FIG. 11), even though a single object OB22 is small in size. Consequently, in the second embodiment, the plurality of blocks BLK representing the small objects OB22 could be used to calculate the average index value AV. In this case, the printing direction could be set to the outgoing direction Df more suited to the small objects OB22. However, the present third embodiment can mitigate the effects of these small objects OB22.

D. Variations of the Embodiments (1) The index value for the printing direction may be selected from among two values ("1" and "4", for example) instead of three values "1", "0", and "−1" used in the embodiments, or may be selected from among four or more values ("1", "0.5", "0", "−0.5", and "−1", for example). In any case, claimed correlation information specifying correlations between input color values and index values may be data in another format rather than a table, such as the index table 300 illustrated in FIG. 7. For example, the correlation information may be a function specifying correlations between input color values and index values.

(2) The evaluation value for each partial image calculated in S500 of FIGS. 9 and S295 of FIG. 11 may be any of various values calculated using index values V for a plurality of pixels in place of the average value AV of index values V for a plurality of pixels used in the embodiments. For example, statistics such as the average, mode, median, maximum, or minimum may be used. Similarly, the block evaluation value BV calculated in S280 of FIG. 11 may be any of various values (a statistic such as the mode, for example) calculated using the index values V for a plurality of pixels in place of the average of index values V for a plurality of pixels.

(3) The process of setting the printing direction may be any of various processes instead of the process described in the embodiments. For example, in S195 and S200 of FIGS. 8 and S260 and S265 of FIG. 11 the total value Tv and processed pixel number Np may be updated regardless of whether the index value V is a non-zero value. Additionally, in S295 of FIG. 11, an evaluation value for each partial image may be calculated using the block evaluation value BV of valid blocks in the partial image (the average value of block evaluation values BV, for example) in place of the index values V for a plurality of pixels in each valid block (the average index value AV in the second embodiment). Further, step S158a of FIG. 13 may be omitted. In this case, all object regions are used for calculating the evaluation value (the average index value AV, for example) irrespective of size. Further, the boundary values for separating ranges RV1, RV2, and RV3 used in S510 to S540 of FIG. 9 may be set to any of various values instead of 0.5 and −0.5. The pixels used for setting the printing direction may be a portion of the plurality of pixels in the subjected image. For example, the printing direction may be set using a plurality of pixels selected from uniformly distributed positions in the subjected image (for example, a plurality of pixels from the even rows configuring the grid arrangement of pixels). Alternatively, the printing direction for each of the plurality of passes may be set without using the subjected image data. For example, the user may set the printing direction for each pass.

(4) The color space of the subjected image data may be any arbitrary color space in addition to the RGB color space (the YCbCr color space, for example). Further, the types of ink available for printing may be any number of types greater than or equal to two and are not limited to the four types C, M, Y, and K. For example, the print execution unit 400 may use the three ink colors C, M, and Y for printing. Further, the order in which the nozzle rows are juxtaposed for each type of ink in the print head 410 may be a different order from that in the embodiments. In any case, an outgoing color conversion profile (the outgoing lookup table LUTf in the embodiments described above) and a return color conversion profile (the return lookup table LUTb in the embodiments described above) are preferably configured as follows. That is, the outgoing color conversion profile correlates a plurality of color values in a specific color space (the input color space in the embodiments described above) the outgoing color conversion profile and return color conversion profile are preferably configured as follows. That is, the outgoing color conversion profile correlates a plurality of color values in a specific color space with a plurality of color values in a first color range within the ink color space, which includes a plurality of component values corresponding to the plurality of ink colors. The return color conversion profile correlates a plurality of color values in the specific color space with a plurality of color values in a second color range within the ink color space. The first color range is a range of colors that includes first color values specifying a first color that can be printed according to a partial print in the outgoing direction using image data based on the outgoing color conversion profile. The first color may be a color that cannot be printed according to a partial print in the return direction using image data based on the return color conversion profile. The second color range is a range of colors that includes second color values specifying a second color that can be printed according to a partial print in the return direction using image data based on the return color conversion profile. The second color may be a color that cannot be printed according to a partial print in the outgoing direction using image data based on the outgoing color conversion profile.

(5) The color conversion profile correlating a plurality of color values in the specific color space, which is the color space of the subjected image data, with a plurality of color values in the ink color space may have any of various configurations in addition to a lookup table. For example, the color conversion profile may be a function for calculating color values in the ink color space on the basis of color values in the specific color space.

(6) The print execution unit 400 may have any of various configurations in addition to the configuration illustrated in FIGS. 1 through 3. For example, the main scanning unit 430 may be configured in any of various ways to be capable of reciprocating the print head 410 in the main scanning direction. Further, the outgoing direction Df may be any one of the two directions along the main scanning direction. For example, the −Dx direction may correspond to the outgoing direction Df. The conveying unit 440 may have any of various configurations capable of conveying the sheet PM in the sub scanning direction in place of the configuration described in the embodiments. Further, the print execution unit 400 may be provided with a platen for supporting the sheet PM, such that the sheet PM is interposed between the platen and the rollers. The ink supply unit 450 may also be supported on the carriage 433. In any case, when an external device such as the terminal device 100 controls a printing device such as the MFP 200 that is provided with the print execution unit 400 to execute a printing operation, the printing device may be considered an example of the printer of the present disclosure.

(7) The control unit 299 of the MFP 200 may execute the printing process in place of the terminal device 100. Specifically, the processor 210 may execute the printing process according to the program 232. In this case, the control unit 299 of the MFP 200 operates as the image processing device of the present disclosure. Alternatively, the control circuit 490 of the print execution unit 400 may execute part of the printing process. Further, the control circuit 490 may be omitted from the print execution unit 400. In the latter case, the image processing device of the present disclosure may control the print execution unit 400 directly. In any case, data including image data representing the image to be printed, and data specifying the printing direction for each pass may be employed as the print data for controlling the print execution unit 400.

(8) The image processing device that executes the printing process may be a device other than a personal computer (a digital camera, scanner, or smartphone, for example). Further, the image processing device may constitute part of a printing device. For example, the control unit 299 of the MFP 200 may execute the printing process. Further, a plurality of devices that can communicate over a network (computers, for example) may each implement some of the functions of the printing process so that the devices as a whole can provide the functions required for implementing the printing process. Here, the system comprising the devices corresponds to the image processing device of the present disclosure.

In the embodiments described above, part of the configuration implemented in hardware may be replaced with software and, conversely, all or part of the configuration implemented in software may be replaced with hardware.

Further, in a case where all or part of functions of the present disclosure is implemented in a computer program, the computer program can be provided in a form stored on a computer-readable storage medium (e.g., non-transitory storage medium). The program can be used in a state stored in the same storage medium as that used when provided or different storage medium. The "computer-readable storage medium" is not limited to a portable storage medium such as a memory card or a CD-ROM, but includes an internal storage device, installed in a computer, such as various ROMs, and an external storage device, connected to the computer, such as a hard disk.

While the description has been made in detail with reference to specific embodiments, the embodiments have been described for easy understanding to the present disclosure. It would be apparent to those skilled in the art that various changes and modifications may be made thereto.

What is claimed is:

1. An image processing device communicable with a printer, the printer including: a print head having a plurality of nozzles, each of the plurality of nozzles being configured to eject a droplet of one of a plurality of types of ink including a first type of ink and a second type of ink, the plurality of nozzles including a first nozzle and a second nozzle disposed apart from the first nozzle in a main scanning direction, the first nozzle being configured to eject a droplet of the first type of ink, the second nozzle being configured to eject a droplet of a second type of ink; a first scanner configured to perform a main scan moving the print head relative to a printing medium in a printing direction, the printing direction being set to one of a first direction and a second direction, the first direction and the second direction being parallel to the main scanning direction and being opposite to each other; and a second scanner configured to perform a sub scan intermittently moving the printing medium relative to the print head in a sub scanning direction orthogonal to the main scanning direction, the printer being configured to repeatedly and alternately execute a partial print and the sub scan to form an image represented by image data on the printing medium, the image comprising a plurality of partial images arranged in the sub scanning direction, the partial print forming a target partial image on the printing medium while performing the main scan, the plurality of partial images being represented by respective ones of plurality of sets of partial image data, the image processing device comprising:

a memory configured to store a first profile and a second profile used in a color conversion process executed for a first-direction partial print and a second-direction partial print, respectively, the first-direction partial print being the partial print in which the printing direction is set to the first direction, the second-direction partial print being the partial print in which the printing direction is set to the second direction, the first profile correlating a plurality of input color values in a specific color space with respective ones of a plurality of first output color values within a first color range in an ink color space, the second profile correlating the plurality of input color values in the specific color space with respective ones of a plurality of second output color values within a second color range in the ink color space, the ink color space including a plurality of ink color values, each of the plurality of ink color values having a plurality of color component values corresponding to respective ones of the plurality of types of ink, the first color range including a first ink color value representing a first color printable by the first-direction partial print and excluding a second ink color value representing a second color unprintable by the first-direction partial print, the second color range including a third ink color value representing a third color printable by the second-direction partial print and excluding a fourth ink color value representing a fourth color unprintable by the second-direction partial print; and a controller configured to perform:

(a) selecting a single partial image one by one from the plurality of partial images as the target partial image, the target partial image comprised of a plurality of pixels and being represented by target partial image data, the target partial image data corresponding to one of the plurality of sets of partial image data and including a plurality of color values corresponding to respective ones of the plurality of pixels;

(b) generating partial print data for the partial print by executing an image process on the target partial image data, the partial print data being used for forming the target partial image by the printer, the image process including the color conversion process, the color conversion process being executed on the target partial image data using one of the first profile and the second profile selected in accordance with the printing direction set for the partial print;

(c) outputting to the printer the partial print data generated for the partial print; and (d) setting the printing direction for the partial print to one of the first direction and the second direction using the plurality of color values, wherein the (b) generating executes the color conversion process using the one of the first profile and the second profile corresponding to the printing direction set in the (d) setting, wherein the memory is configured to further store correlation information correlating each of the plurality of input color values with an index value indicative of the printing direction, and wherein the (d) setting comprises:

(d1) identifying a plurality of index values corresponding to respective ones of the plurality of pixels using the correlation information and respective ones of the plurality of color values;

(d2) calculating an evaluation value for the target partial image using the plurality of index values; and (d3) setting the printing direction for the partial print using the evaluation value.

2. The image processing device according to claim 1, wherein the (d) setting further comprises (d4) identifying a value range including the evaluation value from among a first value range, a second value range, and a third value range between the first value range and the second value range, wherein the (d3) setting sets the first direction as the printing direction for the partial print in response to identifying the first value range, wherein the (d3) setting sets the second direction as the printing direction for the partial print in response to identifying the second value range, and wherein the (d3) setting sets a third direction as the printing direction for the partial print in response to identifying the third value range, the third direction being opposite the printing direction set for a preceding partial print, the partial print being executed subsequent to the preceding partial print.

3. The image processing device according to claim 1, wherein the index value includes a first index value indicating the first direction and a second index value indicating the second direction, the correlation information correlating a color value included in the first color range and excluded from the second color range with the first index value and correlating a color value excluded from the first color range and included in the second color range with the second index value, and wherein the (d2) calculating calculates as the evaluation value one of an average, a mode, a median, a maximum, and a minimum of the plurality of index values.

4. The image processing device according to claim 3, wherein the index value further includes a third index value, the correlation information correlating a color value included both in the first color range and the second color range with the third index value, wherein the (d2) calculating calculates the evaluation value using the plurality of index values excluding the third index value.

5. The image processing device according to claim 1, wherein the (d2) calculating comprises:

(d21) calculating a plurality of block evaluation values for respective ones of a plurality of block images using the plurality of index values, the target partial image comprising the plurality of block images; and
(d22) calculating the evaluation value for the target partial image using the plurality of block evaluation values.

6. The image processing device according to claim 5, wherein the (d21) calculating comprises:
(d211) selecting a single block image one by one from the plurality of block images as a target block image, the target block image being comprised of a plurality of block pixels; and
(d212) calculating a block evaluation value for the target block image using a plurality of block index values corresponding to respective ones of a plurality of block color values.

7. The image processing device according to claim 5, wherein the (d2) calculating further comprises (d23) specifying an invalid block image from among the plurality of block images, and
wherein the (d22) calculating calculates the evaluation value using the plurality of block evaluation values excluding a block evaluation value corresponding to the invalid block image.

8. The image processing device according to claim 7, wherein the (d23) specifying comprises:
(d231) specifying an invalid pixel in each of the plurality of block images, the invalid pixel having a color value included both in the first color range and the second color range; and
(d232) specifying a block image including a plurality of invalid pixels more than a threshold as the invalid block image.

9. The image processing device according to claim 7, wherein the index value includes a first index value indicating the first direction, a second index value indicating the second direction, and a third index value, the correlation information correlating a color value included in the first color range and excluded from the second color range with the first index value, correlating a color value excluded from the first color range and included in the second color range with the second index value, and correlating a color value included both in the first color range and the second color range with the third index value, and
wherein the (d23) specifying comprises:
(d233) specifying an invalid pixel in each of the plurality of block images, the invalid pixel corresponding to the third index value; and
(d234) specifying a block image including a plurality of invalid pixels more than a threshold as the invalid block image.

10. The image processing device according to claim 1, wherein the (d) setting further comprises:
(d5) calculating a plurality of block evaluation values for respective ones of a plurality of block images using the plurality of index values, the target partial image comprising the plurality of block images; and
(d6) specifying an invalid block image from among the plurality of block images using the plurality of block evaluation values, the invalid block image being comprised of a plurality of invalid-block pixels corresponding to respective ones of a plurality of invalid-block index values, and
wherein the (d2) calculating calculates the evaluation value for the target partial image using the plurality of index values excluding the plurality of invalid-block index values.

11. The image processing device according to claim 10, wherein the index value includes a first index value indicating the first direction, a second index value indicating the second direction, and a third index value, the correlation information correlating a color value included in the first color range and excluded from the second color range with the first index value, correlating a color value excluded from the first color range and included in the second color range with the second index value, and correlating a color value included both in the first color range and the second color range with the third index value,
wherein the (d6) specifying comprises:
(d61) specifying an invalid pixel in each of the plurality of block images, the invalid pixel corresponding to the third index value; and
(d62) specifying a block image including a plurality of invalid pixels more than a threshold as the invalid block image.

12. The image processing device according to claim 1, wherein the (d) setting further comprises (d7) identifying at least one object region representing respective ones of at least one object image in the target partial image, the at least one object region including a plurality of object pixels among the plurality of pixels, the plurality of object pixels having respective ones of a plurality of object color values,
wherein the (d1) identifying identifies a plurality of object index values corresponding to respective ones of the plurality of object color values using the correlation information, and
wherein the (d2) calculating calculates the evaluation value for the target partial image using the plurality of object index values.

13. The image processing device according to claim 12, wherein the (d7) identifying specifies a valid object region from among the at least one object region, the valid object region having a region size greater than a threshold, the valid object region being comprised of a plurality of valid-object pixels having respective ones of a plurality of valid-object color values, and
wherein the (d1) identifying identifies a plurality of valid-object index values corresponding to respective ones of the plurality of valid-object color values, and
wherein the (d2) calculating calculates the evaluation value using the plurality of valid-object index values.

14. A non-transitory computer readable storage medium storing a set of program instructions for an image processing device communicable with a printer, the printer including: a print head having a plurality of nozzles, each of the plurality of nozzles being configured to eject a droplet of one of a plurality of types of ink including a first type of ink and a second type of ink, the plurality of nozzles including a first nozzle and a second nozzle disposed apart from the first nozzle in a main scanning direction, the first nozzle being configured to eject a droplet of the first type of ink, the second nozzle being configured to eject a droplet of a second type of ink; a first scanner configured to perform a main scan moving the print head relative to a printing medium in a printing direction, the printing direction being set to one of a first direction and a second direction, the first direction and the second direction being parallel to the main scanning direction and being opposite to each other; and a second scanner configured to perform a sub scan intermittently moving the printing medium relative to the print head in a sub scanning direction orthogonal to the main scanning direction, the printer being configured to repeatedly and alternately execute a partial print and the sub scan to form an image represented by image data on the printing medium, the image comprising a plurality of partial images arranged in the sub scanning direction, the partial print forming a target partial image on the printing medium while performing the main scan, the plurality of partial images being represented by respective ones of plurality of sets of partial image data, the image processing device including:

a memory configured to store a first profile and a second profile used in a color conversion process executed for a first-direction partial print and a second-direction partial print, respectively, the first-direction partial print being the partial print in which the printing direction is set to the first direction, the second-direction partial print being the partial print in which the printing direction is set to the second direction, the first profile correlating a plurality of input color values in a specific color space with respective ones of a plurality of first output color values within a first color range in an ink color space, the second profile correlating the plurality of input color values in the specific color space with respective ones of a plurality of second output color values within a second color range in the ink color space, the ink color space including a plurality of ink color values, each of the plurality of ink color values having a plurality of color component values corresponding to respective ones of the plurality of types of ink, the first color range including a first ink color value representing a first color printable by the first-direction partial print and excluding a second ink color value representing a second color unprintable by the first-direction partial print, the second color range including a third ink color value representing a third color printable by the second-direction partial print and excluding a fourth ink color value representing a fourth color unprintable by the second-direction partial print; and a controller, the set of program instructions, when executed by the controller, causing the image processing device to perform:

(a) selecting a single partial image one by one from the plurality of partial images as the target partial image, the target partial image comprised of a plurality of pixels and being represented by target partial image data, the target partial image data corresponding to one of the plurality of sets of partial image data and including a plurality of color values corresponding to respective ones of the plurality of pixels;

(b) generating partial print data for the partial print by executing an image process on the target partial image data, the partial print data being used for forming the target partial image by the printer, the image process including the color conversion process, the color conversion process being executed on the target partial image data using one of the first profile and the second profile selected in accordance with the printing direction set for the partial print;

(c) outputting to the printer the partial print data generated for the partial print; and (d) setting the printing direction for the partial print to one of the first direction and the second direction using the plurality of color values, wherein the (b) generating executes the color conversion process using the one of the first profile and the second profile corresponding to the printing direction set in the (d) setting, wherein the memory is configured to further store correlation information correlating each of the plurality of input color values with an index value indicative of the printing direction, and wherein the (d) setting comprises:
(d1) identifying a plurality of index values corresponding to respective ones of the plurality of pixels using the correlation information and respective ones of the plurality of color values;
(d2) calculating an evaluation value for the target partial image using the plurality of index values; and
(d3) setting the printing direction for the partial print using the evaluation value.

* * * * *